United States Patent

Haraguchi et al.

[11] Patent Number: 6,002,498
[45] Date of Patent: Dec. 14, 1999

[54] IMAGE PROCESSING METHOD AND IMAGE FORMING METHOD

[75] Inventors: Tsuyoshi Haraguchi; Yutaka Takei; Ichiroh Maeda; Shigeru Mano; Toshihisa Takeyama, all of Hino, Japan

[73] Assignee: Konica Corporation, Tokyo, Japan

[21] Appl. No.: 08/938,316

[22] Filed: Sep. 26, 1997

Related U.S. Application Data

[63] Continuation-in-part of application No. 08/489,516, Jun. 12, 1995, abandoned.

[30] Foreign Application Priority Data

Jun. 15, 1994 [JP] Japan ................................. 6-132941
Mar. 23, 1995 [JP] Japan ................................. 7-064338

[51] Int. Cl.⁶ ................................. H04N 1/46; G03F 3/08
[52] U.S. Cl. ........................ 358/518; 358/501; 358/504; 358/406
[58] Field of Search ................................. 358/400, 406, 358/447, 448, 455, 456, 458, 500–505, 512, 514, 515, 517, 518, 520, 521, 523, 527, 296; 382/162, 167; 395/109; 347/224, 232, 233, 237, 238, 240, 251; 430/97, 43, 359, 357, 358, 365

[56] References Cited

U.S. PATENT DOCUMENTS

| | | | |
|---|---|---|---|
| 3,804,531 | 4/1974 | Kosaka et al. | 356/405 |
| 4,717,954 | 1/1988 | Fujita et al. | 358/523 |
| 4,943,834 | 7/1990 | Maeda et al. | 358/512 |
| 4,975,862 | 12/1990 | Keller et al. | 382/112 |
| 5,053,808 | 10/1991 | Takagi | 355/38 |
| 5,309,256 | 5/1994 | Takada et al. | 358/504 |
| 5,315,381 | 5/1994 | Yamashita et al. | 358/500 |
| 5,335,096 | 8/1994 | Shimazaki et al. | 358/518 |
| 5,337,130 | 8/1994 | Satoh | 355/77 |
| 5,345,315 | 9/1994 | Shalit | 358/406 |
| 5,391,443 | 2/1995 | Simons et al. | 430/21 |
| 5,422,738 | 6/1995 | Ishihara et al. | 358/500 |
| 5,428,720 | 6/1995 | Adams, Jr. | 358/518 |
| 5,452,112 | 9/1995 | Wan et al. | 358/504 |
| 5,508,826 | 4/1996 | Lloyd et al. | 358/501 |
| 5,539,522 | 7/1996 | Yoshida | 358/296 |
| 5,539,523 | 7/1996 | Nakai et al. | 358/296 |
| 5,543,940 | 8/1996 | Sherman | 358/518 |
| 5,555,073 | 9/1996 | Grossman et al. | 355/41 |
| 5,579,132 | 11/1996 | Takahashi et al. | 358/527 |
| 5,805,313 | 9/1998 | Hayashi et al. | 358/518 |
| 5,818,960 | 10/1998 | Gregory, Jr. et al. | 382/167 |

*Primary Examiner*—Edward L. Coles
*Assistant Examiner*—Joseph R. Pokrzywa
*Attorney, Agent, or Firm*—Finnegan, Henderson, Farabow, Garrett & Dunner, L.L.P.

[57] ABSTRACT

Y image, M image, C image and a mixed-dye image wherein Y, M and C are mixed are prepared by an image forming apparatus, analytical density for each of Y, M and C components in their complementary color wavelength regions is measured by a densitometer for each of Y image, M image and C image, then Y image, M image, C image and a mixed-dye image are read by the aforesaid image reading apparatus and spectral densities for in B, G and R wavelength regions are obtained. A conversion function for obtaining analytical density from spectral density is obtained from the spectral densities obtained by the image reading apparatus and the analytical density obtained through measurement by a densitometer.

16 Claims, 16 Drawing Sheets

FIG. 6

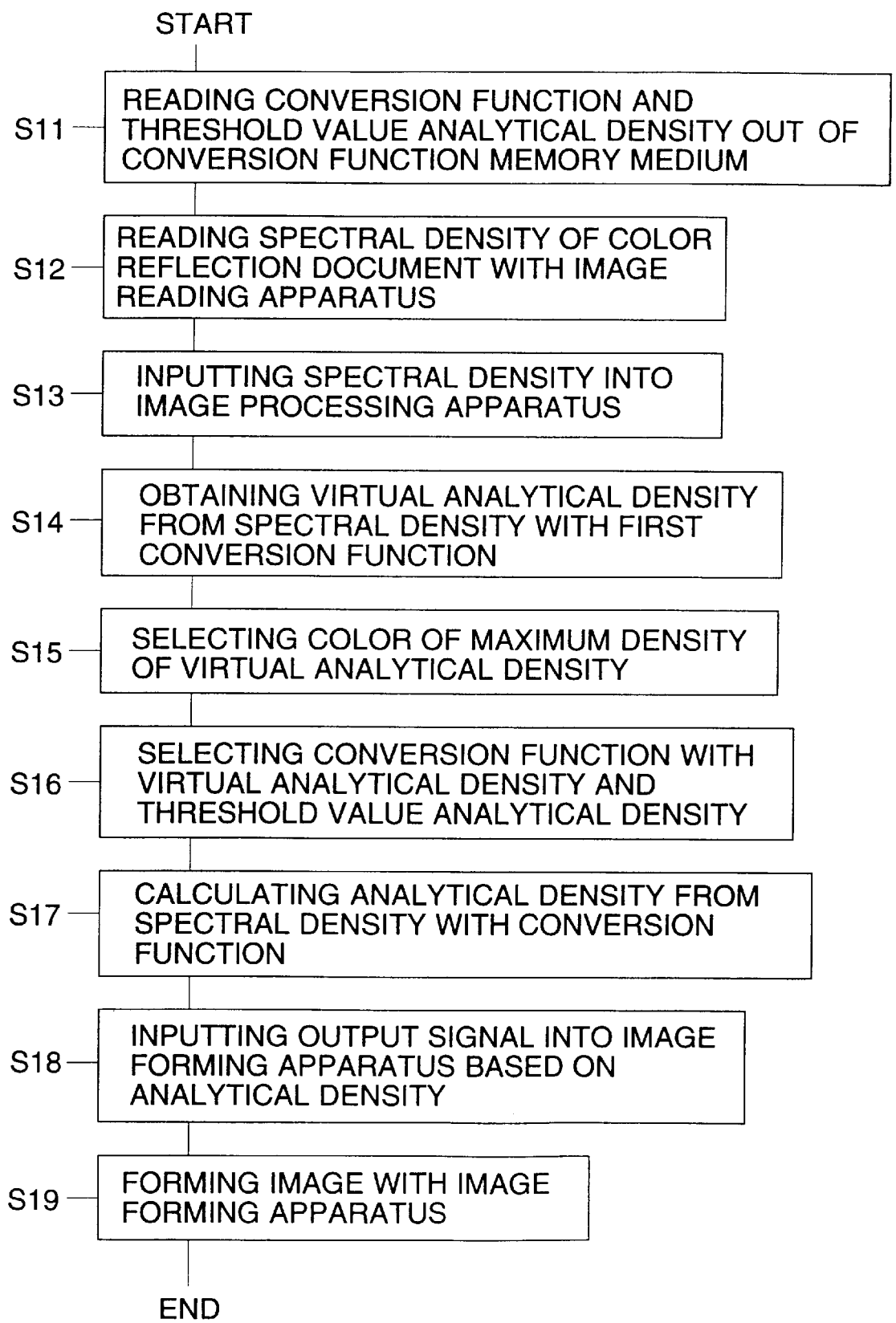

START

S11 — READING CONVERSION FUNCTION AND THRESHOLD VALUE ANALYTICAL DENSITY OUT OF CONVERSION FUNCTION MEMORY MEDIUM

S12 — READING SPECTRAL DENSITY OF COLOR REFLECTION DOCUMENT WITH IMAGE READING APPARATUS

S13 — INPUTTING SPECTRAL DENSITY INTO IMAGE PROCESSING APPARATUS

S14 — OBTAINING VIRTUAL ANALYTICAL DENSITY FROM SPECTRAL DENSITY WITH FIRST CONVERSION FUNCTION

S15 — SELECTING COLOR OF MAXIMUM DENSITY OF VIRTUAL ANALYTICAL DENSITY

S16 — SELECTING CONVERSION FUNCTION WITH VIRTUAL ANALYTICAL DENSITY AND THRESHOLD VALUE ANALYTICAL DENSITY

S17 — CALCULATING ANALYTICAL DENSITY FROM SPECTRAL DENSITY WITH CONVERSION FUNCTION

S18 — INPUTTING OUTPUT SIGNAL INTO IMAGE FORMING APPARATUS BASED ON ANALYTICAL DENSITY

S19 — FORMING IMAGE WITH IMAGE FORMING APPARATUS

END

FIG. 8

$$
\begin{array}{c}
 & 1 & & i & \\
Y & \begin{pmatrix} IrY1 \\ IgY1 \\ IbY1 \end{pmatrix} \Rightarrow \begin{pmatrix} 0 \\ 0 \\ Ab1 \end{pmatrix} & \cdots & \begin{pmatrix} IrYi \\ IgYi \\ IbYi \end{pmatrix} \Rightarrow \begin{pmatrix} 0 \\ 0 \\ Abi \end{pmatrix} & \bullet \\[2ex]
M & \begin{pmatrix} IrM1 \\ IgM1 \\ IbM1 \end{pmatrix} \Rightarrow \begin{pmatrix} 0 \\ Ag1 \\ 0 \end{pmatrix} & \cdots & \begin{pmatrix} IrMi \\ IgMi \\ IbMi \end{pmatrix} \Rightarrow \begin{pmatrix} 0 \\ Agi \\ 0 \end{pmatrix} & \bullet \\[2ex]
C & \begin{pmatrix} IrC1 \\ IgC1 \\ IbC1 \end{pmatrix} \Rightarrow \begin{pmatrix} Ar1 \\ 0 \\ 0 \end{pmatrix} & \cdots & \begin{pmatrix} IrCi \\ IgCi \\ IbCi \end{pmatrix} \Rightarrow \begin{pmatrix} Ari \\ 0 \\ 0 \end{pmatrix} & \bullet \\[2ex]
Y+M & \begin{pmatrix} IrR1 \\ IgR1 \\ IbR1 \end{pmatrix} \Rightarrow \begin{pmatrix} Ar1 \\ Ag1 \\ 0 \end{pmatrix} & \cdots & \begin{pmatrix} IrRi \\ IgRi \\ IbRi \end{pmatrix} \Rightarrow \begin{pmatrix} Ari \\ Agi \\ 0 \end{pmatrix} & \bullet \\[2ex]
M+C & \begin{pmatrix} IrB1 \\ IgB1 \\ IbB1 \end{pmatrix} \Rightarrow \begin{pmatrix} 0 \\ Ag1 \\ Ab1 \end{pmatrix} & \cdots & \begin{pmatrix} IrBi \\ IgBi \\ IbBi \end{pmatrix} \Rightarrow \begin{pmatrix} 0 \\ Agi \\ Abi \end{pmatrix} & \bullet \\[2ex]
C+Y & \begin{pmatrix} IrG1 \\ IgG1 \\ IbG1 \end{pmatrix} \Rightarrow \begin{pmatrix} Ar1 \\ 0 \\ Ab1 \end{pmatrix} & \cdots & \begin{pmatrix} IrGi \\ IgGi \\ IbGi \end{pmatrix} \Rightarrow \begin{pmatrix} Ari \\ 0 \\ Abi \end{pmatrix} & \bullet \\[2ex]
Y+M+C & \begin{pmatrix} IrN1 \\ IgN1 \\ IbN1 \end{pmatrix} \Rightarrow \begin{pmatrix} Ar1 \\ Ag1 \\ Ab1 \end{pmatrix} & \cdots & \begin{pmatrix} IrNi \\ IgNi \\ IbNi \end{pmatrix} \Rightarrow \begin{pmatrix} Ari \\ Agi \\ Abi \end{pmatrix} & \bullet
\end{array}
$$

IMAGE PROCESSING METHOD AND IMAGE FORMING METHOD

This application is a continuation-in-part of U.S. patent application Ser. No. 08/489,516, filed on Jun. 12, 1995 now abandoned.

BACKGROUND OF THE INVENTION

The present invention relates to an image processing method and an image forming method for obtaining a conversion function for obtaining analytical density representing an amount of dye from spectral densities of a color image.

Heretofore, various methods have been developed for improving color reproducibility of a color image in reading a color image by an image reading apparatus through reflected light and making a print on an image forming apparatus from spectral density of a color image read by the image reading apparatus in the wavelength regions of the primary colors of R (red), G (green) and B (blue). Generally, a color image is formed by cyan (C), magenta (M) and yellow (Y) dyes under the subtractive color mixing principle. FIG. 16 shows the spectral absorption characteristics of each dye and the spectral absorption characteristics of a color image formed by mixing these dyes. As can be seen from the spectral absorption characteristics of each dye, for example, the yellow dye absorbs not only light in the blue wavelength region which corresponds to the complemental color wavelength region of the yellow dye, but also slightly absorbs the light in the red wavelength region and the green wavelength region. Accordingly, when spectral densities of the yellow dye are measured, the spectral densities of db(Y), dg(Y) and dr(Y) are obtained. Likewise, when spectral densities of the magenta dye are measured, the spectral densities of db(M), dg(M) and dr(M) are obtained, and when spectral densities of the cyan dye are measured, the spectral densities of db(C), dg(C) and dr(C) are obtained. There is the following relationship among these spectral densities.

Db=db(Y)+db(M)+db(C)

Dg=dg(Y)+dg(M)+dg(C)

Dr=dr(Y)+dr(M)+dr(C)

Each spectral density from db(Y) to dr(C) in the right side of the above formulas is called an analytical density. In contrast, each spectral density of Db, Dg and Dr in the left side of the above formulas is called an integral density.

The spectral densities of a color image obtained by an image reading apparatus are integral densities. That is, in the integral density Db in the blue wavelength region, an analytical density db(M) of magenta dye in the blue wavelength region and an analytical density db(C) of cyan dye in the blue wavelength region are added with the analytical density db(Y) of yellow dye in the blue wavelength region, wherein the magenta and cyan dyes are not a blue wavelength absorbing dye respectively, and, on the other hand, the yellow dye is a blue wavelength absorbing dye. Accordingly, although the analytical density db(Y) of yellow dye in the blue wavelength region represents an amount of the yellow dye, the integral density Db in the blue wavelength region is not equal to the analytical density db(Y) of yellow dye in the blue wavelength region. That is, the integral density Db in the blue wavelength region is not equal to the amount of the yellow dye which is the blue wavelength absorbing dye. Consequently, if the printing is conducted by an image outputting apparatus on the basis of the integral densities, color contamination may take place, resulting in that it may be difficult to reproduce a high quality image. Incidentally, the analytical density db(Y) of yellow dye in the blue wavelength region is called the primary density in the blue wavelength region, on the other hand, the analytical density db(M) of magenta dye and the analytical density db(C) of cyan dye in the blue wavelength region are called the auxiliary absorption densities in the blue wavelength region.

When an original image is a transmission document, a conversion function represented by Expression [1] is used for obtaining the analytical density from the spectral densities which are integral densities.

$$\begin{pmatrix} A_r \\ A_g \\ A_b \end{pmatrix} = \begin{pmatrix} 1 & W_{rg} & W_{rb} \\ W_{gr} & 1 & W_{gb} \\ W_{br} & W_{bg} & 1 \end{pmatrix} \begin{pmatrix} I_r \\ I_g \\ I_b \end{pmatrix} \quad \text{Expression [1]}$$

$I_r$, $I_g$, $I_b$: Spectral density (Integral density)

$A_r$, $A_g$, $A_b$: Analytical density $W_{kl}$: Ratio of secondary absorption density (density of 1 primary color) to main density (density of k primary color) of subtractive dye (k≠l=r,g,b)

This method is effective for a transmission original image. However, when reading a color image through reflected light, it does not always agree with Expression [1] due to an influence of scattering or the like. When reading a color image through reflected light, it is known that correct analytical density can not be obtained by a conversion function of Expression [1].

It is therefore known that a conversion function represented by Expression [2] is used for obtaining analytical density which is more accurate.

$$\begin{pmatrix} A_r \\ A_g \\ A_b \end{pmatrix} = $$

$$\begin{pmatrix} \alpha_{11} & \alpha_{12} & \alpha_{13} & \alpha_{14} & \alpha_{15} & \alpha_{16} & \alpha_{17} & \alpha_{18} & \alpha_{19} \\ \alpha_{21} & \alpha_{22} & \alpha_{23} & \alpha_{24} & \alpha_{25} & \alpha_{26} & \alpha_{27} & \alpha_{28} & \alpha_{29} \\ \alpha_{31} & \alpha_{32} & \alpha_{33} & \alpha_{34} & \alpha_{35} & \alpha_{36} & \alpha_{37} & \alpha_{38} & \alpha_{39} \end{pmatrix}$$

$$\begin{pmatrix} I_r \\ I_g \\ I_b \\ I_r^2 \\ I_g^2 \\ I_b^2 \\ I_r \times I_g \\ I_g \times I_b \\ I_b \times I_r \end{pmatrix}$$

Expression [2]

$I_r$, $I_g$, $I_b$: Spectral density (Integral density)

$A_r$, $A_g$, $A_b$: Analytical density

αij: Matrix coefficient

This method can provide analytical density more effectively than the method of Expression [1]. However, even this method can not offer the correct analytical density because it is difficult to prepare the aimed color chip accurately, though many color chips representing analytical density determined by an image forming apparatus and a matrix coefficient is obtained by the use of the color chips. Further, considerable length of processing time is required for obtaining analytical density, which is a disadvantage.

Further, there is a problem that analytical density can not be obtained correctly through Expressions [1] and [2] especially in a high density area and a low density area, because a ratio of secondary absorption density to primary density of dyes for subtractive color process varies depending on an amount of the primary density of the subtractive dyes.

In addition, Japanese Patent O.P.I. Publication No. 88344/1992 discloses a method wherein a color reflection original image is read by an image reading apparatus, analytical density is obtained by using a ratio of secondary absorption density to primary density of color materials for subtractive color process and a coefficient indicating an index from spectral density of each primary color read by the image reading apparatus, and a print is made by an image forming apparatus based on the obtained analytical density.

In the method mentioned above, a color transmission-type original image made of photographic emulsions of a color reflection original image is prepared, and a coefficient indicating an index is obtained from the relation between transmission density of the color transmission-type original image and reflection density of the color reflection original image. However, the ratio of secondary absorption density to primary density of dyes for subtractive color process varies depending on the primary density of the dyes for subtractive color process due to an influence of scattering on the reflection original image. Therefore, the analytical density obtained in a low density area or a high density area in particular does not agree with an actual analytical density and thereby color reproduction in high fidelity can not be carried out, which is a problem.

In conventional technologies employing many chromaticities including those disclosed in Japanese Patent O.P.I. Publication No. 117567/1988, arbitrary input signals are given to an image forming apparatus in advance, various prints are made, and thereby the relation between the input signals for the image forming apparatus and the chromaticities (for example, chromaticity of L*a*b* color specification system, chromaticity of L*u*v* color specification system, and chromaticity of XYZ color specification system, etc.) is obtained in advance, then a color reflection original image is read by an image reading apparatus, chromaticities are obtained from photometry values of each primary color of the color reflection original image read by the aforesaid image reading apparatus, and thereby optimum input signals for the image forming apparatus are selected based on the obtained chromaticity.

However, in these conventional technologies employing chromaticities (for example, chromaticity of L*a*b* color specification system, chromaticity of L*u*v* color specification system, and chromaticity of XYZ color specification system, etc.), it is required to prepare many accurate standard color chips with known chromaticities in advance for obtaining a function (three-dimensional LUT or three-dimensional matrix) for converting the photometry values obtained by the image reading apparatus into chromaticities, and it is further required to convert the photometry values obtained by the image reading apparatus into chromaticities by using the function mentioned above and also to convert the chromaticities to input signals for the image forming apparatus. For obtaining the function (three-dimensional LUT or three-dimensional matrix) for converting from the chromaticity to an input signal for the image forming apparatus, there are required complicated processes wherein various kinds of color chips by means of input signals established in advance are prepared, each color chip is subjected to photometry by means of an image reading apparatus, and obtained photometry values are converted to chromaticity values. Further, in order to obtain these two functions correctly, standard color chips are required to be selected appropriately and the kinds of color chips prepared by the image forming apparatus need to be selected appropriately. The reason for this is that when either of a standard color chip for obtaining a chromaticity correctly from an image reading apparatus and a color chip for obtaining accurately an output value for an image forming apparatus is not prepared appropriately, correct color reproducing capability can not be obtained. In particular, when an individual image reading apparatus and an individual image forming apparatus are used in combination, chromaticity aimed by one apparatus is easily deviated from that aimed by the other apparatus, causing color reproducibility to be poor.

In addition, there is a problem that the time for computing process is long because of the combination of three-dimensional or higher computing processes in two steps including that from a photometry value to a chromaticity and that from a chromaticity to an input signal for an image forming apparatus.

SUMMARY OF THE INVENTION

An object of the invention is to obtain, through simple operation, analytical density representing an amount of a color dye with which a print can reproduce colors of a color image with high fidelity, in the case wherein a color image is read by an image reading apparatus in a way of reflected light and a print is made by an image forming apparatus based on spectral density the color image read by the image forming apparatus in the wavelength region of each primary color.

Further object of the invention is to solve the problem that analytical density obtained in a low density area or a high density area in particular does not agree with actual analytical density because a ratio of secondary absorption density to primary density of dyes for subtractive color process varies due to an influence of scattering in the case of a reflection original image depending on the primary density of the dyes for subtractive color process, and to make the color reproduction with high fidelity possible through simple operation.

The objects of the invention mentioned above can be attained through the following methods.

1. An image processing method comprising, a step to make a yellow image employing only a yellow dye,
   a magenta image employing only a magenta dye and a cyan image employing only a cyan dye by an image forming apparatus,
   a step to obtain spectral density in each of red, green and blue wavelength regions through reflected light for each of the aforementioned yellow image, magenta image and cyan image,
   a step to obtain, by the use of a densitometer, analytical density for each of the yellow image in the blue wavelength region, the magenta image in the green wavelength region and the cyan image in the red wavelength region, and
   a step to obtain, from the spectral density obtained by the image reading apparatus and from the analytical density obtained by the densitometer, the conversion function that is used for obtaining the analytical density from the spectral density.

2. It is preferable that the aforementioned image processing method is provided with;
   a step wherein a mixed-dye image in which at least two kinds of dyes out of yellow dyes, magenta dyes and cyan dyes are mixed is made by the image forming apparatus, and a step to obtain a spectral density signal for each of red, green and blue of the aforementioned mixed-dye image through reflected light by the use of the aforementioned image reading apparatus.

3. It is preferable that the step for obtaining the mixed-dye image mentioned above is a step wherein the aforesaid image forming apparatus makes an image in which yellow dyes in quantity identical to that of the aforesaid yellow image, magenta dyes in quantity identical to that of the aforesaid magenta image and cyan dyes in quantity identical to that of the aforesaid cyan image are mixed.

4. It is preferable that the step for obtaining the aforementioned mixed-dye image is a step in which the aforesaid image forming apparatus makes an image wherein yellow dyes and magenta dyes identical in terms of amount respectively to the yellow image and the magenta image are mixed, an image wherein magenta dyes and cyan dyes identical in terms of amount respectively to the magenta image and the cyan image are mixed, an image wherein cyan dyes and yellow dyes identical in terms of amount respectively to the cyan image and the yellow image are mixed, and an image wherein yellow dyes, magenta dyes and cyan dyes identical in terms of amount respectively to the yellow image, the magenta image and the cyan image are mixed.

5. It is preferable that a plurality of the yellow images, a plurality of magenta images and a plurality of the cyan images are made so that each of them has different density levels.

6. It is preferable that a plurality of the yellow images, a plurality of magenta images, a plurality of the cyan images and a plurality of the mixed-dye images are made so that each of them has different density levels.

7. It is preferable that the number of the aforesaid density levels is 3 to 80.

8. It is preferable that the aforesaid conversion function is obtained from the aforesaid spectral density and the aforesaid analytical density both within a range of corresponding density, for each of plural density areas in quantity identical to or lower than the aforesaid number of density levels.

9. It is preferable that the aforesaid density area is selected by the analytical density.

10. It is preferable that the aforesaid conversion function includes a matrix and is obtained by a multiple regression analysis.

11. It is preferable that the aforesaid densitometer is one wherein a half-value width of a distribution of spectral sensitivity for each of red, green and blue does not overlap each other.

12. It is preferable that the aforesaid image reading apparatus serves also as the aforesaid densitometer.

13. It is preferable that the yellow image, the magenta image, the cyan image and the mixed-dye image all mentioned above are those formed on a silver halide color light-sensitive material.

14. The aforementioned objects are attained by an image forming method comprising a step wherein a color image is read by an image reading apparatus through reflected light and thereby photometry densities for red, green and blue are obtained, a step to obtain analytical density from spectral density based on the conversion function for obtaining analytical density from spectral density obtained by the image processing method described in one of the aforementioned methods 1 to 13, and a step to determine, based on the analytical density mentioned above, an amount of yellow dyes, an amount of magenta dyes and an amount of cyan dyes all in an image forming apparatus, and thereby to make a print.

15. It is preferable that the aforesaid step to obtain analytical density from spectral density consists of a step to store in a memory medium the conversion function for obtaining analytical density from spectral density obtained by the image processing method described in one of the aforementioned methods 1 to 13 and a step to obtain analytical density from the spectral density based on the conversion function stored in the memory medium mentioned above.

The above objective of the present invention is preferably attained by the following method.

16. An image processing method, comprising steps of:

(A) forming a yellow image with a given amount of yellow dye alone, a magenta image with a given amount of magenta dye alone and a cyan image with a given amount of cyan dye alone;

(B) obtaining spectral densities of each of the yellow image, the magenta image and the cyan image in the red, green and blue wavelength regions;

(C) obtaining an analytical density of an yellow component in the blue wavelength region from the yellow image, an analytical density of a magenta component in the green wavelength region from the magenta image, and an analytical density of a cyan component in the red wavelength region from the cyan image;

(D) forming a mixed-dye image by using at least two of the given amount of yellow dye, the given amount of magenta dye, and the given amount of cyan dye so that the mixed-dye image comprises at least two of a yellow component, a magenta component and a cyan component;

(E) obtaining spectral densities of the mixed-dye image in the red, green and blue wavelength regions;

(F) determining an analytical density of the yellow component in the blue wavelength region, an analytical density of the magenta component in the green wavelength region and an anlytical density of the cyan component in the red wavelenght in the mixed-dye image on the basis of the analytical densities of the yellow, magenta and cyan components in their complementary color wavelength regions obtained from the yellow, magenta and cyan images; and (G) arranging, for each of the yellow, magenta and cyan images and the mixed-dye image, the spectral densities in the red, green and blue wavelength regions obtained in the steps (B) and (E) so as to correspond to the analytical densities of the yellow, magenta and cyan components in their complimentary color wavelength regions obtained in the step (C) and (F), thereby obtaining a conversion function to obtain analytical densities of yellow, magenta and cyan components in their complementary color wavelength regions in a color image from spectral densities of the color image in the red, green and blue wavelength regions.

17. The spectral densities in the red, green and blue wavelength regions are obtained by the use of an image reading apparatus.

18. The analytical density of the yellow component in the blue wavelength region, the analytical density of the magenta component in the green wavelength region, and the analytical density of the cyan component in the red wavelength region are obtained by the use of a densitometer.

19. In the step (C) in Item 16, the spectral density of the yellow image in the blue wavelength region, the spectral density of the magenta image in the green wavelength region, and the spectral density of the cyan image in the red wavelength region which are obtained in the step (B) are used as the analytical density of the yellow component in the blue wavelength region, the analytical density of the magenta component in the green wavelength region, and the analytical density of the cyan component in the red wavelength region.

20. In the step (F) in Item 16, when the mixed-dye image is formed by mixing the given amount of yellow dye, the given amount of magenta dye, and the given amount of cyan dye, the analytical density of the yellow component in the blue wavelength region, the analytical density of the magenta component in the green wavelength region, and the analytical density of the cyan component in the red wavelength region which are obtained in the step (C) are used as the analytical densities of the yellow, magenta and cyan components in their complementary color wavelength regions in the mixed-dye image.

Herein, as explained with reference to FIG. 16, the spectral density is an optical density in the red wavelength region, the green wavelength region or the blue wavelength region obtained by an image reading apparatus such as a color scanner, a color CCD camera and so on.

Taking as an example the spectral density in the red wavelength region obtained from a color image in which color dyes are mixed, the spectral density in the red wavelength region is the sum of the auxiliary absorption density dr(Y) of yellow dye, the auxiliary absorption density dr(M) of magenta dye and the primary density dr(C), wherein the yellow and magenta dyes are not a red wavelength absorbing dye respectively, and, on the other hand, the cyan dye is a red wavelength absorbing dye. Therefore, the spectral density obtained from the color image in which color dyes are mixed is called the integral density. In the parent application, the integral density was called the photometric density.

In contrast to the integral density of a mixed-dye image (a mixed-dye image), the spectral density obtained from a pure color image (a single dye image) formed by a single color dye is called an analytical density. Further, among these analytical densities, the analytical density (a photographic density) of a dye in the complementary color wavelength in terms of the color of the dye represents an amount of dye. That is, the analytical density of the yellow image in the blue wavelength region represents an amount of yellow dye, the analytical density of the magenta image in the green wavelength region represents an amount of magenta dye, and the analytical density of the cyan image in the red wavelength region represents an amount of cyan dye.

Then, a yellow image is formed with a given amount of a yellow dye alone, a magenta image is formed with a given amount of a magenta dye alone, and a cyan image is formed with a given amount of a cyan dye alone. The analytical density in the blue wavelength region is obtained from the thus formed yellow image, the analytical density in the green wavelength region is obtained from the thus formed magenta image, and the analytical density in the red wavelength region is obtained from the thus formed cyan image. The relationship between the analytical density of the single dye image in the complementary color wavelength region in terms of the color of the single dye image and an amount of the dye is obtained for each dye.

Further, in the present invention, the spectral density of a single dye image and an analytical density of the single dye image in the complementary color wavelength of the color of the single dye are measured for each dye. Also, the spectral density of a mixed-dye image is measured.

However, analytical densities of the mixed-dye image in the complementary color wavelengths of the colors of the dyes used in the mixed-dye image are determined based on the analytical densities of the single dye images in the complementary color wavelengths of the colors of the single dyes measured for each dye. Then, these spectral densities of the single dye images and the mixed-dye images are arranged so as to correspond to the analytical densities of the single dye images and the mixed-dye images in the complementary color wavelengths of the respectively, whereby a conversion function to convert spectral densities in the blue, green and red wavelength regions to analytical densities in complementary color wavelengths of dyes is calculated. It may be preferable that the conversion function is a matrix function. Furthermore, since the spectral densities and the analytical densities are optical densities in the three color wavelength regions of blue, green and red wavelength regions respectively, it may be more preferable that the matrix function is formed in a matrix of (3×3). However, the conversion function need not necessarily be the matrix function. For example, a LUT (a look-up table) to obtain analytical densities from spectral densities may be used as the conversion function.

Incidentally, it may be preferable to use a spectral densitometer to measure the spectral density of the single dye image in the complimentary color wavelength of the color of the dye used for the single dye image and to use the measured spectral density as the analytical density of the single dye image. However, the among spectral densities of the single dye image measured by the image reading apparatus, the spectral density of the single dye image in the complimentary color wavelength of the dye can be used as the analytical density.

In the present invention, in addition to the original meaning of density, needless to say, the density implies a value substantially corresponding to the density. As an example of the value substantially corresponding to the density, a first order function of the density may be listed. For example, a spectral density in the blue wavelength region is obtained in such a manner that spectral data in the blue wavelength region is obtained as a corresponding value of a reflection ratio by an image reading apparatus and then a density value is obtained by converting the inverted value of the corresponding value of the reflection ratio into the value corresponding to the density with the logarithmic technique. In this manner, the corresponding value of the reflection ratio may be used as the density.

BRIEF DESCRIPTION OF THE DRAWINGS

FIG. 6 is a flow chart of an image production method in an example.

FIG. 8 is a diagram showing the relationship between the spectral density obtained by an image reading apparatus for calculation in an example (Irki, Igki, Ibki: k=Y, M, C, B, G, R, or N i=1 to 15) and the analytical density obtained by the densitometer (Ari, Agi, Abi: i=1 to 15).

DETAILED DESCRIPTION OF THE PREFERRED EMBODIMENT

As an example of the invention, there will be described below the concrete example to which, however, the invention is not limited. In the example, there are made conclusive expressions, but they show the preferable examples (examples considered by the inventors to be the best mode) and the scope of technologies of the invention is not limited to them.

1. Outline of the Equipment

Figure 2:
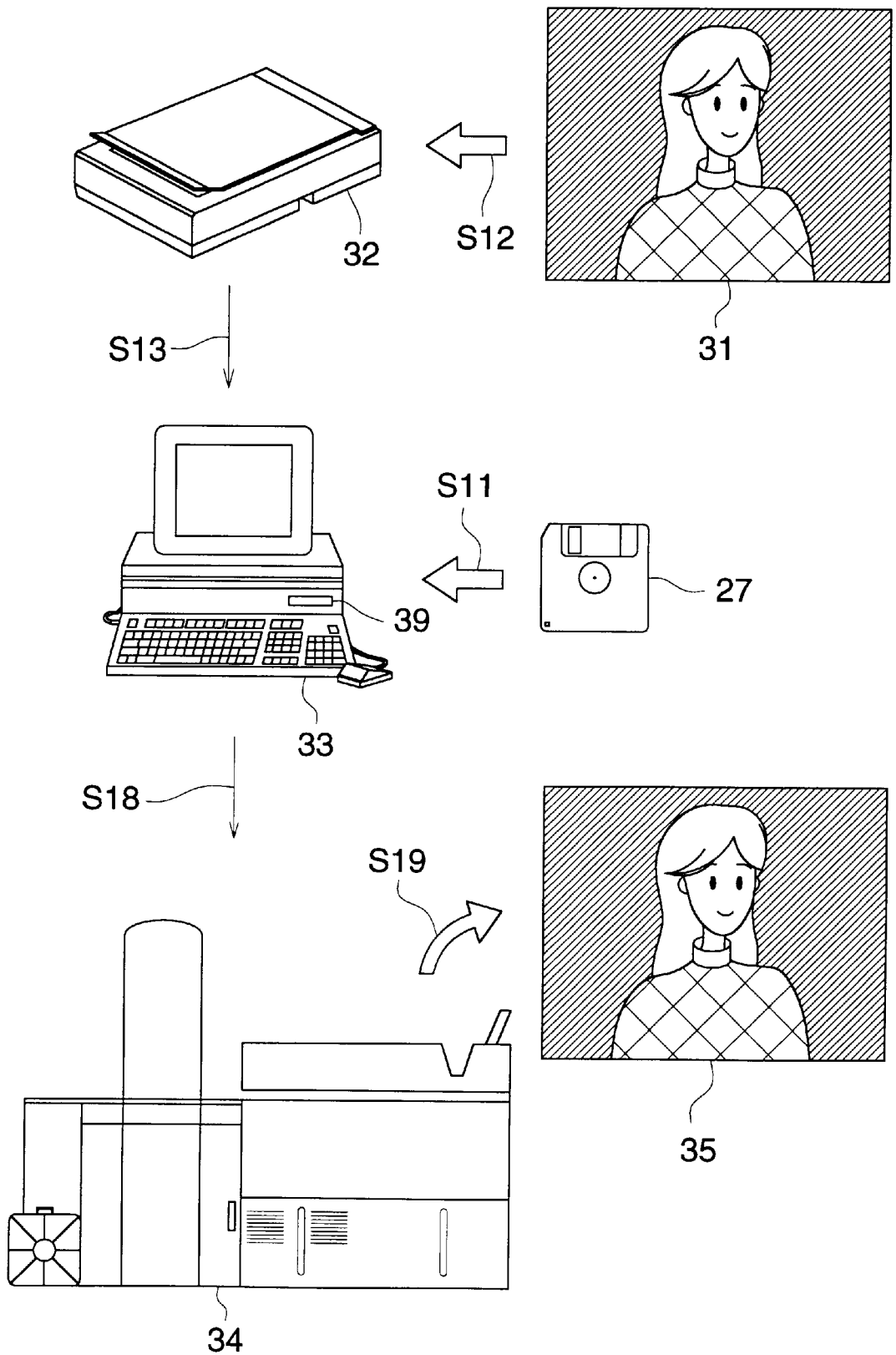
FIG. 2 is a diagram showing an image forming apparatus in the example.

FIG. 2 shows an image forming apparatus that reads a color image through reflected light and makes a print. Image reading apparatus 32 reads spectral density for each of primary colors of red, green and blue of color image 31 through reflected light. From conversion function memory medium 27 in which the conversion function for obtaining analytical density from spectral density is stored, memory medium reading device 39 attached to image processing apparatus 33 reads the conversion function for obtaining analytical density from spectral density shown below.

$$\begin{pmatrix} A_r \\ A_g \\ A_b \end{pmatrix} = \begin{pmatrix} \alpha_{rr} & \alpha_{rg} & \alpha_{rb} \\ \alpha_{gr} & \alpha_{gg} & \alpha_{gb} \\ \alpha_{br} & \alpha_{bg} & \alpha_{bb} \end{pmatrix} \begin{pmatrix} I_r \\ I_g \\ I_b \end{pmatrix} \quad \text{Expression [3]}$$

Figure 3:
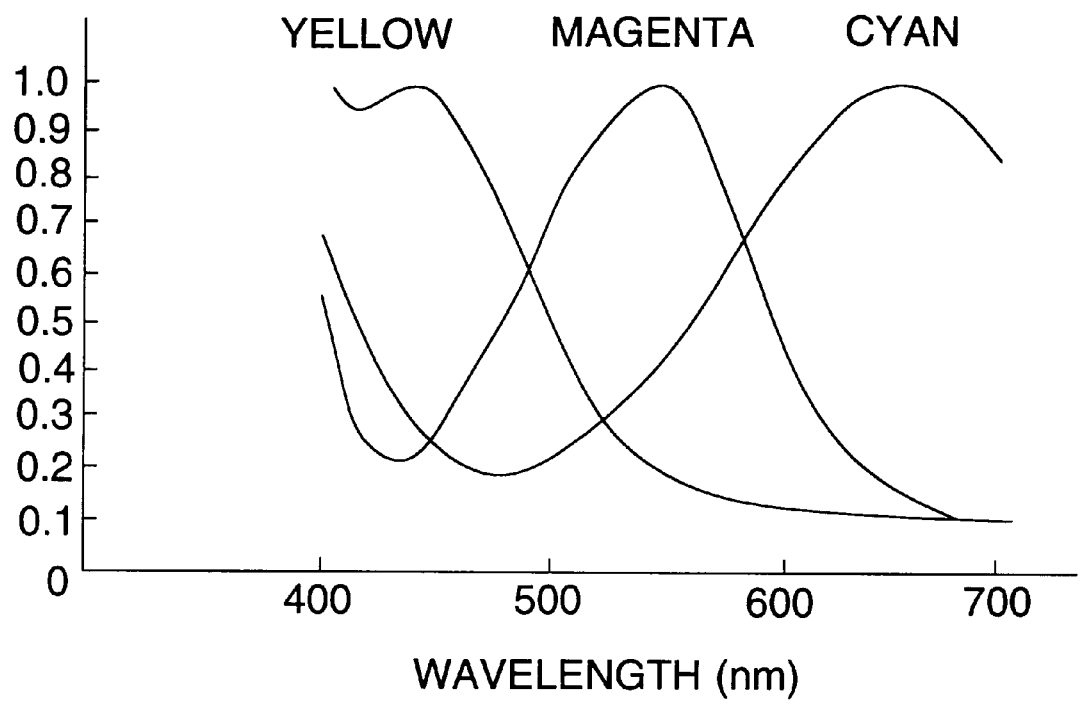
FIG. 3 is a diagram showing spectral coloring characteristics of a print made by the image forming apparatus in the example.

$A_r$: Analytical density in the R (red) wavelength region
$A_g$: Analytical density in the G (green) wavelength region
$A_b$: Analytical density in the B (blue) wavelength region
$I_r$: Spectral density in the R (red) wavelength region
$I_g$: Spectral density in the G (green) wavelength region
$I_b$: Spectral density in the B (blue) wavelength region $\alpha_{ij}$ (i=r,g,b, j=r,g,b): 3×3 matrix component of conversion function As a conversion function memory medium 27, a floppy disk and a memory such as a ROM may also be acceptable in addition to photominidisk shown in FIG. 2. The image processing apparatus 33 obtains analytical density for each of yellow, magenta and cyan dyes from the spectral density obtained by the image reading device 32 through its reading, based on the conversion function which has been obtained through reading. Then, the image processing apparatus 33 generates output signals to image forming apparatus 34 based on the obtained analytical density. Then, in the image forming apparatus 34, a silver halide color photographic light-sensitive material containing the three primary colors of yellow (which may be abbreviated as Y, hereafter), magenta (which may be abbreviated as M, hereafter) and cyan (which may be abbreviated as C, hereafter) is subjected to CRT exposure, and then is processed so that print 35 may be made. FIG. 3 is a diagram showing the color spectral characteristics of a photographic paper that is a silver halide color photographic light-sensitive material containing the three primary colors of Y, M and C used in the example. The invention is not naturally limited to those for silver halide color photographic materials, but better color reproduction is attained when the silver halide color photographic material is used.

Figure 1:
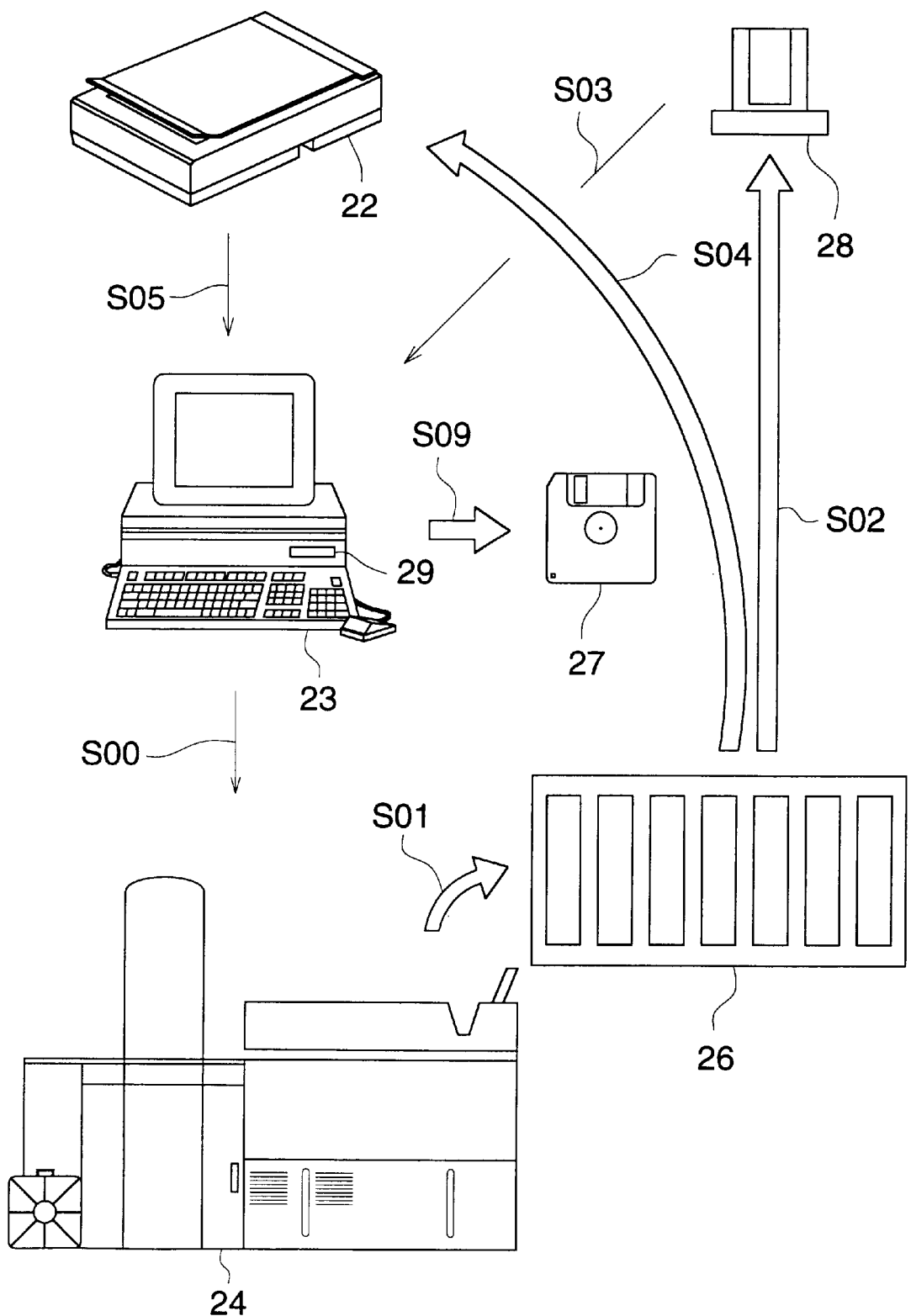
FIG. 1 is a diagram showing an equipment for producing a memory medium for a conversion function in the example.

Next, FIG. 1 shows a production equipment for conversion function memory medium 27 that stores therein the conversion function for obtaining analytical density from spectral density in the image forming apparatus mentioned above. Calculation-use image forming apparatus 24 makes color chip 26 of a print whose spectral coloring characteristics are the same as those of a print made by image forming apparatus 34 in FIG. 2. Then, densitometer 28 measures analytical density for each of the yellow image (Y image) in the blue wavelength region, the magenta image (M image) in the green wavelength region and the cyan image (C image) in the red wavelength region on color chip 26. Further, calculation-use image reading apparatus 22 reads, through reflected light, Y image, M image and C image and a mixed-dye image of the color chip 26 to obtain the spectral densities each image in the red, green and blue wavelength regions. Then, in calculation-use image processing apparatus 23, conversion function having therein 3×3 matrix for obtaining analytical density from spectral density is obtained based on the spectral density obtained by the calculation-use image reading apparatus 22 and analytical density obtained by densitometer 28. When obtaining the conversion function through a multiple regression analysis, accurate conversion function can be obtained. After that, memory medium writing device 29 attached to the calculation-use image processing apparatus 23 makes the conversion function obtained by the calculation-use image processing apparatus 23 to be stored in conversion function memory medium 27.

Incidentally, it is satisfactory that calculation-use image reading apparatus and a calculation-use image forming apparatus are those having the same spectral characteristics and coloring characteristics as those of an image apparatus and an image forming apparatus, and the same apparatus may play both performances.

2. Production Method for Conversion Function

Figure 5:
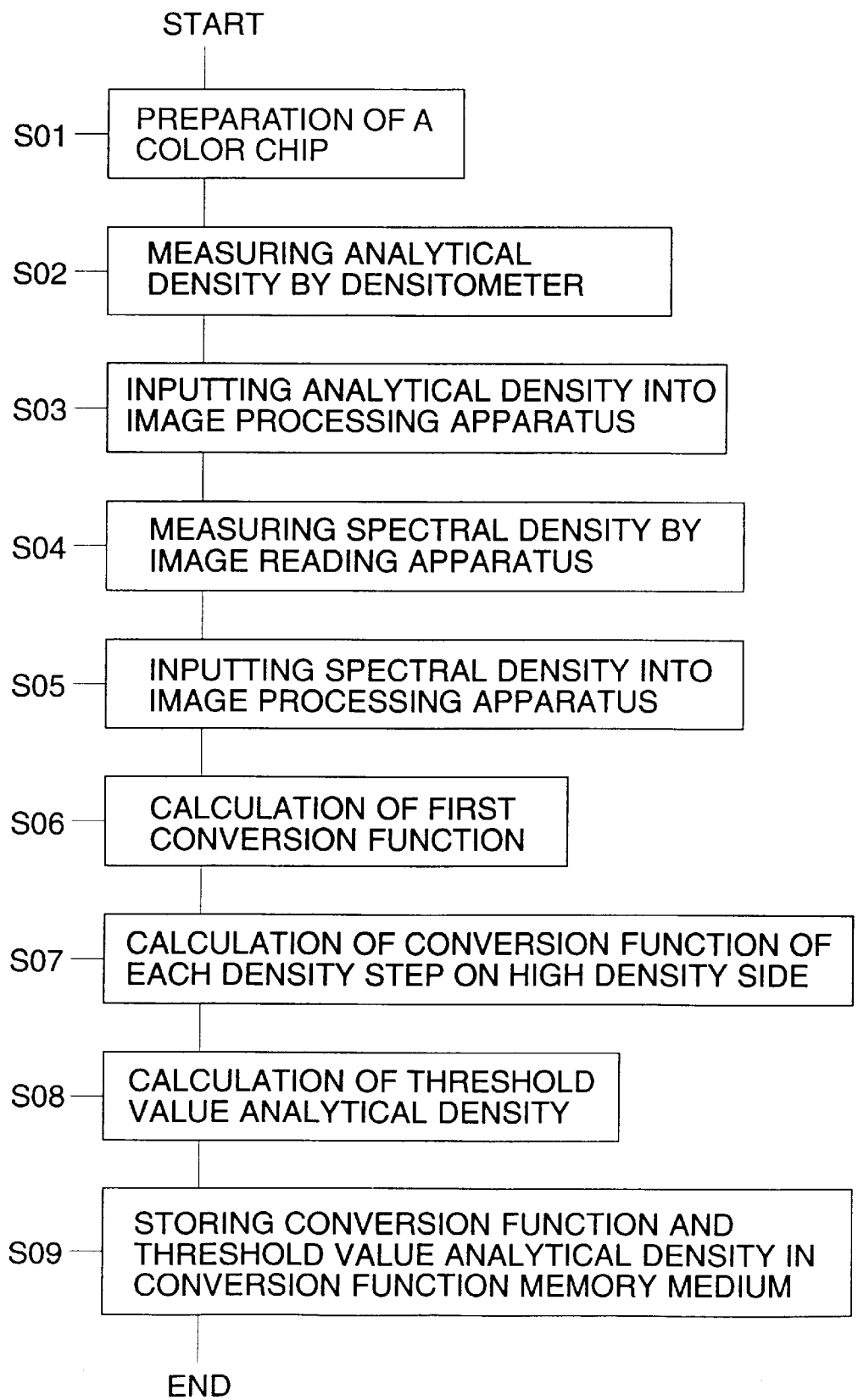
FIG. 5 is a flow chart of a production method for conversion function memory medium 27 in an example.
Figure 7:
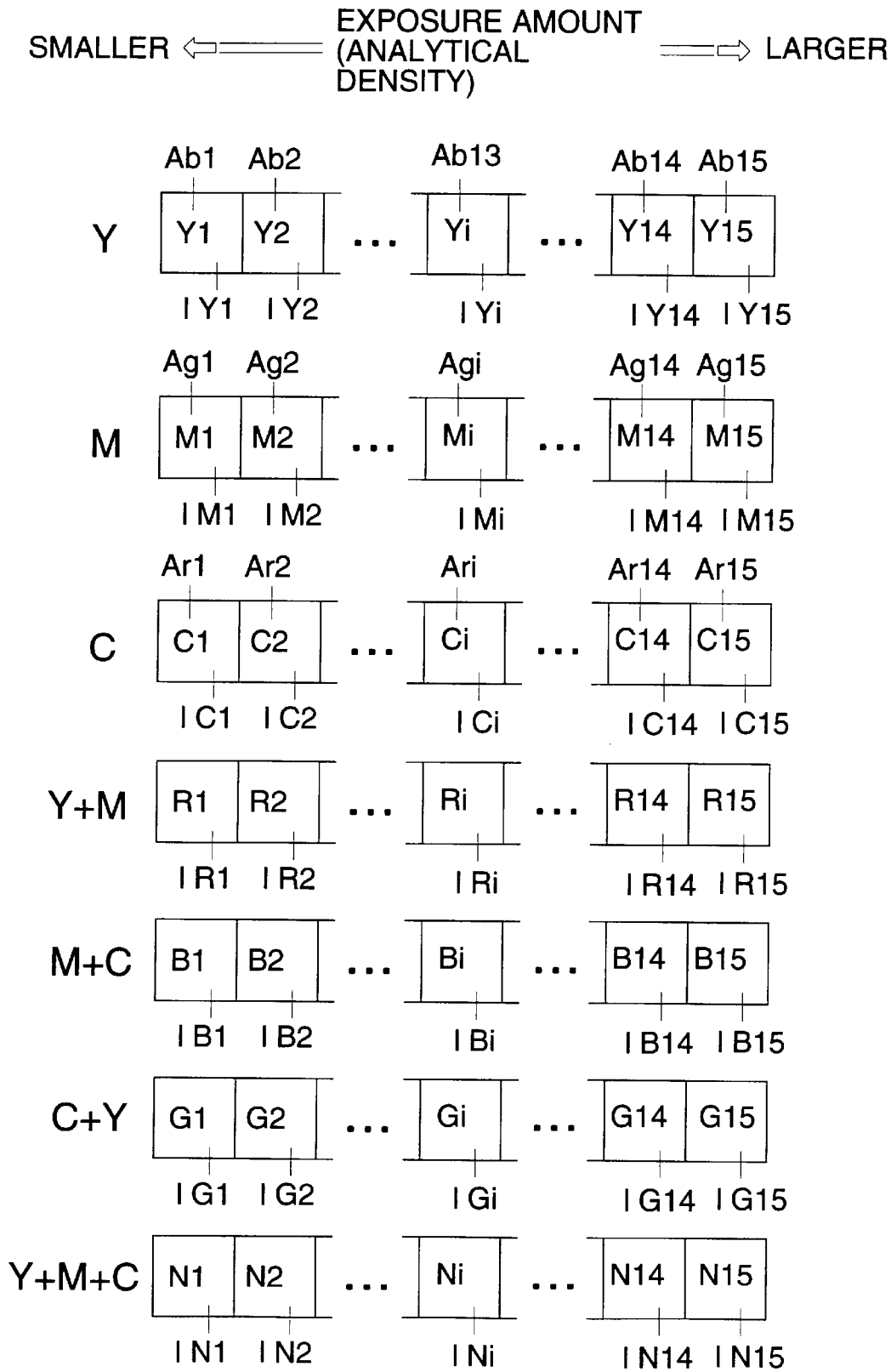
FIG. 7 is a diagram showing the relationship between a color chip used for a production equipment for a conversion function memory medium in an example and analytical density as well as spectral density both obtained from the color chip.

A production method for conversion function will be explained in detail as follows. FIG. 5 is a flow chart of a production method for conversion function. First, color chip 26 having 15 density steps as shown in FIG. 7 is prepared (S01). Namely, photographic paper is subjected to exposure in such a manner that an exposure amount is increased gradually by 0.15 in terms of exposure amount Log E, and is processed in calculation-use image forming apparatus 24 which thereby makes color chip 26 having mixed-dye image of Y+M+C with 15 density steps wherein all of 3 colors of Y, M and C are mixed (Ni: i=1 to 15), mixed-dye image of Y+M with 15 density steps wherein Y and M are mixed (Ri: i=1 to 15), mixed-dye image of M+C with 15 density step wherein M and C are mixed (Bi: i=1 to 15), mixed-dye image of C+Y with 15 density steps wherein C and Y are mixed (Gi: i=1 to 15), yellow image with 15 density steps wherein only Y dye is contained (Yi: i=1 to 15), magenta image with 15 density step wherein only M dye is contained (Mi: i=1 to 15) and green image with 15 density steps wherein only C dye is contained (Ci: i=1 to 15). In this case, the exposure amount of each of primary colors of red, green and blue for the photographic paper to form each of Y image, M image and C image at each density step (density level) is equal to that to form the mixed-dye image of Y+M+C. Therefore, for each density step, an amount of dyes used to form each of Y, M and C images is equal to that used in the mixed-dye image of Y+M+C. Likewise, an amount of exposure of each primary color of red, green or blue to form the mixed-dye images of Y+M, M+C, and C+Y at each density level is equal to that to form the aforesaid mixed-dye image of Y+M+C except unexposed primary colors. Therefore, an amount of each dye used to form the mixed-dye images of Y+M, M+C and C+Y is equal to that of each dye to form the mixed-dye image of Y+M+C.

Incidentally, hereafter, let it be assumed that each of 15 density steps is indicated with arbitrary number i, arbitrary number i for the step where the exposure amount is 0 is defined to be 1, and after that, arbitrary number i is increased as the density goes up. When indicating these images with symbols, let it be assumed further, hereafter, that character k represents one of a yellow image, a magenta image, a cyan image, a yellow+magenta mixed-dye image, a magenta+cyan mixed-dye image, a cyan+yellow mixed-dye image and a yellow+magent+cyan mixed-dye image, and the yellow image is indicated by Y, the magenta image is indicated by M and, the cyan image is indicated by C, the yellow+magenta mixed-dye image is indicated by R, the magenta+cyan mixed-dye image is indicated by B, the cyan+yellow mixed-dye image is indicated by G, and the yellow+magenta+cyan mixed-dye image is indicated by N. Incidentally, I and A in FIG. 7 are symbols used in the explanation which will be made later.

Further, for the calculation-use image forming apparatus 24, a photographic paper identical to that used in the image forming apparatus 34 to form an image thereon was used so that a print made by the calculation-use image forming apparatus 24 may have the same spectral coloring characteristics as in the print made by the image forming apparatus 34. Incidentally, signals necessary for the calculation-use image forming apparatus 24 to form color chip 26 are naturally sent from calculation-use image processing apparatus 23 (S00).

Figure 4:
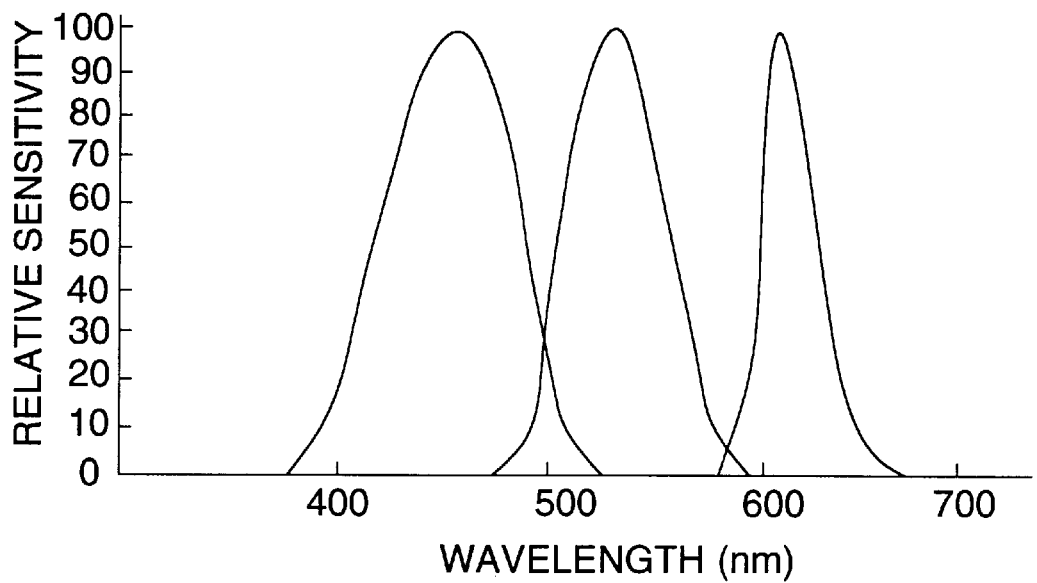
FIGS. 4(A) and 4(B) represent a diagram showing the spectral sensitivity characteristics of a densitometer used in a production equipment for a conversion function memory medium in an example.
Figure 4:
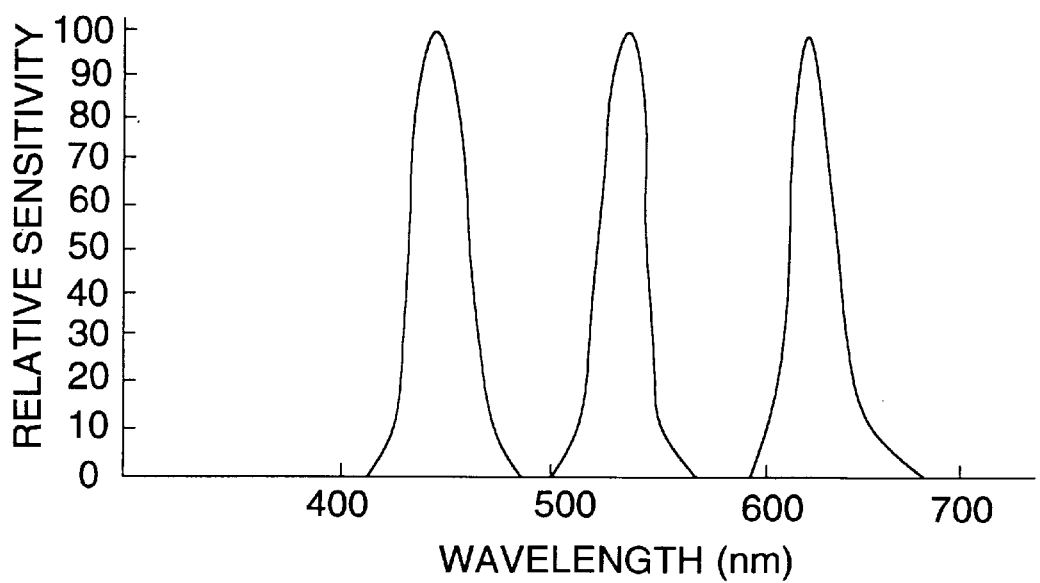

Next, analytical density (Abi: i=1 to 15) of Y image (Yi: i=1 to 15), analytical density (Agi: i=1 to 15) of M image (Mi: i=1 to 15) and analytical density (Ari: i=1 to 15) of C image (Ci: i=1 to 15) all of color chip 28 are measured by densitometer 28 in the step of S02 as shown in FIG. 7. FIG. 4 shows an example of spectral sensitivity distribution of the densitometer used in the above case. (A) represents an ordinary densitometer, and (B) represents spectral sensitivity of a preferable densitometer in the invention. In the spectral sensitivity for each primary color, a half-value width of the spectral sensitivity distribution for each primary color does not overlap each other as shown in FIGS. 4(A) and 4(B). As shown in (B), in particular, it is preferable that the foot portion of spectral sensitivity distribution does not overlap each other. Compared with color spectral characteristics of a photographic paper shown in FIG. 3, the peak wavelength of densitometer 28 in terms of each primary color is within an area of wavelength corresponding to the spectral density that is not less than 0.8 times that for the peak in the photographic paper, and its peak almost agrees with that for the photographic paper.

Next, in the step of S03, analytical density (Abi: i=1 to 15) of M image (Yi: i=1 to 15), analytical density (Agi: i=1 to 15) of M image (Mi: i=1 to 15) and analytical density (Ari: i=1 to 15) of C image (Ci: i=1 to 15) of color chip 26 obtained by densitometer 28 are inputted into calculation-use image processing apparatus 23 through data interface.

Then, in the step of S04, calculation-use image reading apparatus 22 is an image reading apparatus having the same spectral sensitivity characteristics as in image reading apparatus 32. The calculation-use image reading apparatus 22 reads Y image (Yi: i=1 to 15), M image (Mi: i=1 to 15), C image (Ci: i=1 to 15), Y+M mixed-dye image (Ri: i=1 to 15), M+C mixed-dye image (Bi: i=1 to 15), C+Y mixed-dye image (Gi: i=1 to 15) and Y+M+C mixed-dye image (Ni: i=1 to 15) as shown in FIG. 7, and thereby obtains spectral density in the three primary color wavelength regions of red, green and blue (Irki, Igki, Ibki: k=Y, M, C, B, G, N, i=1–15). Incidentally, Irki, Igki and Ibki are collectively indicated with Iki (k=Y, M, C, B, G, R, N, i=1–15).

In the step of S05, spectral density (Irki, Igki, Ibki: k=Y, M, C, B, G, R, N, i=1–15) of Y image (Yi: i=1 to 15) of M image (Mi: i=1 to 15), C image (Ci: i–1–15), Y+M mixed-dye image (Gi: i=1 to 15) and Y+M+C mixed-dye image (Ni: i=1 to 15) all of color chip 26 are inputted into calculation-use image processing apparatus 23 through data interface.

In the step of S06, the first conversion functions for obtaining analytical density from spectral density are obtained from spectral density and analytical density for all density areas. Namely, in the calculation-use image processing apparatus 23, the relation between spectral density obtained by calculation-use image reading apparatus 22 for all density areas (Irki, Igki, Ibki: k=Y, M, C, B, G, R, N, i=1–15) and analytical density obtained by densitometer 28 (Ari, Agi, Abi: i=1–15) is set to be the same as that shown in FIG. 8. Namely, there is set the relation of 105 that is 15 density steps multiplied by 7 colors. Based on this relation, the first conversion function including 3×3 matrix for obtaining analytical density (Ar, Ag, Ab) from spectral density (Ir, Ig, Ib) is obtained through a multiple regression analysis.

Next, in the step of S07, the relation between analytical density for each density step (Ari, Agi, Abi) and spectral density of Y image (Yi), M image (Mi), C image (Ci), Y+M mixed-dye image (Bi), C+Y mixed-dye image (Gi) and Y+M+C mixed-dye image (Ni) (Irki, Igki, Ibki) is set to be the same as that shown in FIG. 8 concerning each of 6 density steps at a high density side (i=10–15). Namely, there is set the relation of 7 that is 1 density step multiplied by 7 colors For each density step, conversion functions (second conversion function—seventh conversion function) are obtained from the relation mentioned above. Incidentally, the second conversion function is one obtained from the density step data of i=10, and hereafter, n-th conversion function is one obtained from the density step data of i=8+n.

In the step of S08, threshold value analytical density (SArj, SAgi, SAbj (i=1–6)) that is a threshold value for selecting the conversion function to be used from conversion functions is obtained. The threshold value analytical density (SArj, SAgi, SAbj (j=1–6)) is obtained by the following expressions from analytical density of r, g and b between adjacent steps in 7 density steps at a high density side (Ari, Agi, Abi (i=9–15)).

SArj={Ar (j+8)+Ar (j+8)}/2
SAgj={Ag (j+8)+Ag (j+8)}/2
SAbj={Ab (j+8)+Ab (j+8)}/2
j: 1–6

Figure 9:
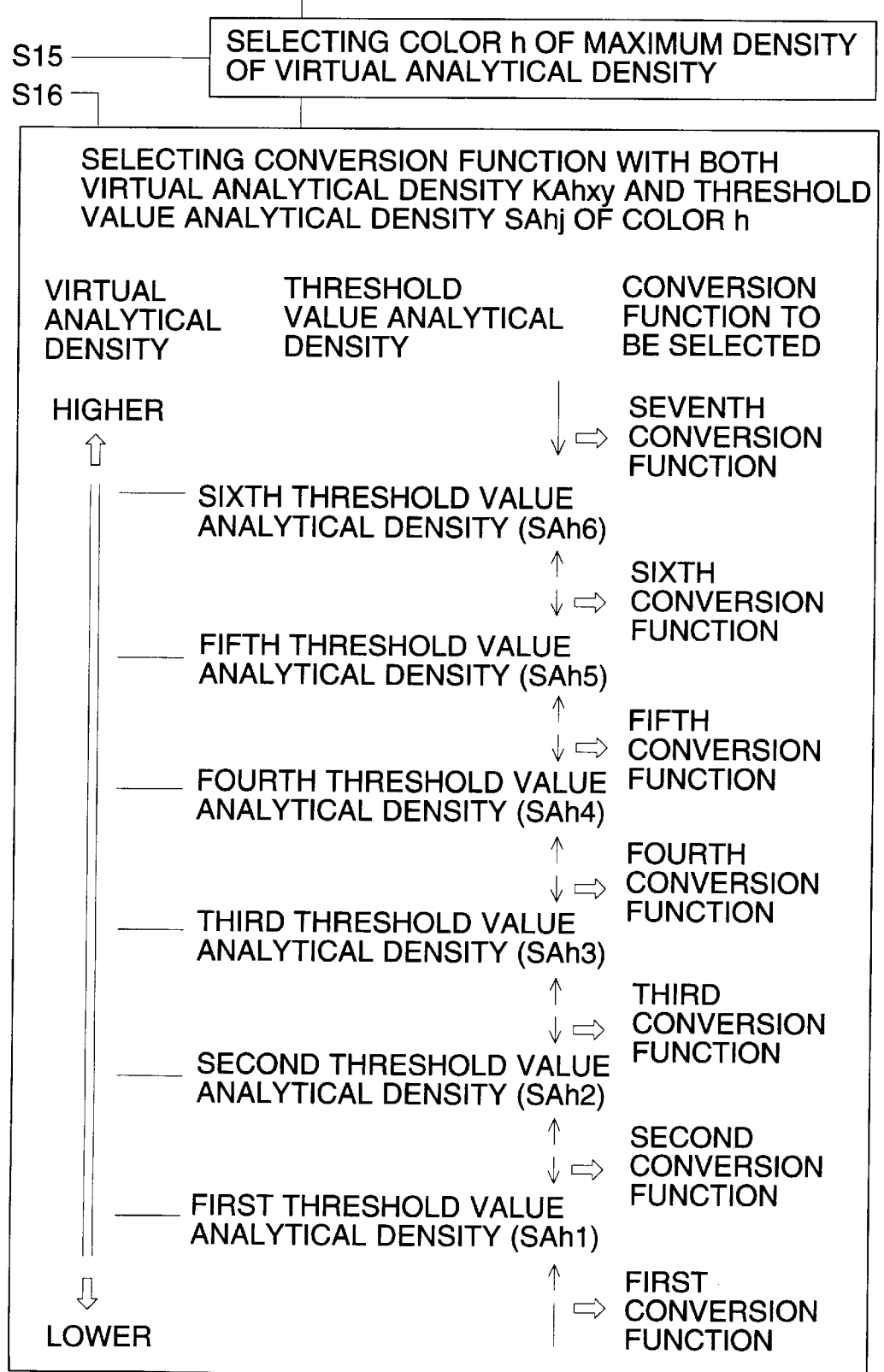
FIG. 9 is a diagram showing the relationship between a threshold value analytical density (SArj, SAgj, SAbj (j=1 to 6)) and a conversion function to be used.

The relation between the threshold value analytical density (SArj, SAgj, SAbj (j=1–6)) and the conversion function to be used is shown in FIG. 9. Incidentally, the explanation for FIG. 9 is omitted. In the order of j=1–6, the threshold value analytical density is called the first threshold value analytical density—sixth threshold value analytical density.

Next, in the step of S09, memory medium writing device 29 attached to calculation-use image processing apparatus 23 causes the conversion functions (first conversion function—seventh conversion function) obtained by calculation use image processing apparatus 23 and threshold value analytical density (SArj, SAgj, SAbj (j=1–6)) to be stored in the conversion function memory medium 27.

Incidentally, as a variation, the calculation-use image reading apparatus 22 may be provided with a function of densitometer 28.

3. Method of Forming a Print in an Image Forming Apparatus

A method of forming a print in an image forming apparatus will be explained in detail as follows. FIG. 6 is a flow chart of an image production method. In the first place, memory medium reading device 39 in the image processing apparatus 33 reads conversion functions (first conversion function—seventh conversion function) for obtaining analytical density from spectral density and threshold value analytical density (SArj, SAgj, SAbj (j=1–6)) out of conversion function memory medium 27 that stores the conversion function for obtaining analytical density from spectral density and threshold value analytical density, in the step of S11.

Next, in the step of S12, spectral density (Irxy, Igxy, Ibxy: x represents a position in the y direction of each pixel, and y represents a position in the y direction of each pixel) of r, g and b of each pixel (xy: x represents a position in the x direction of each pixel and y represents a position in the y direction of each pixel) of color reflection original image 31 are read by image reading apparatus 32.

After that, in the step of S13, spectral density (Irxy, Igxy, Ibxy) of each pixel (xy) of r, g and b of color image 31 read by image reading apparatus 32 are inputted into image processing apparatus 33 through data interface.

Then, in the step of S14, virtual analytical density (KArxy, KAgxy, KAbxy) of r, g and b of each pixel (xy) are obtained by the image processing apparatus 33 from spectral density of r, g and b (Irxy, Igxy, Ibxy) of each pixel (xy) read by the image reading apparatus 32 with the first conversion function.

Next, in the step of S15, the image processing apparatus 33 selects the color h (h is either one of r, g and b) of the maximum density among virtual analytical density of r, g and b (KArxy, KAgxy, KAbxy), for each pixel (xy).

After that, in the step of S16, the image processing apparatus 33 selects, with regard to the color h selected in the step of S15, some conversion function among the first through the seventh conversion functions from both threshold value analytical density (SAhj (j=1–6)) and virtual analytical density (KAhxy), for each pixel (xy). This is shown in FIG. 9 wherein some conversion function among the first through the seventh conversion functions is selected based on the threshold value analytical density (SAhi: i=1–6). Virtual analytical density (KAhxy) is higher at the upper portion in FIG. 9. Hereafter, an explanation will be made beginning with that for the lower portion in FIG. 9. Selection is made through the following; when virtual analytical density (KAhxy) is lower than the first threshold value analytical density (SAh1), the first conversion function is selected, when virtual analytical density (KAhxy) is equal to or higher than the first threshold value analytical density (SAh1) and lower than the second threshold value analytical density (SAh2), the second conversion function is selected, when virtual analytical density (KAhxy) is equal to or higher than the second threshold value analytical density (SAh2) and lower than the third threshold value analytical density (SAh3), the third conversion function is selected, when virtual analytical density (KAhxy) is equal to or higher than the third threshold value analytical density (SAh3) and lower than the fourth threshold value analytical density (SAh4), the fourth conversion function is selected, when virtual analytical density (KAhxy) is equal to or higher than the fourth threshold value analytical density (SAh4) and lower than the fifth threshold value analytical density (SAh5), the fifth conversion function is selected, when virtual analytical density (KAhxy) is equal to or higher than the fifth threshold value analytical density (SAh5) and lower than the sixth threshold value analytical density (SAh6), the sixth conversion function is selected, and when virtual analytical density (KAhxy) is equal to or higher than the sixth threshold value analytical density (SAh6), the seventh conversion function is selected.

Then, in the step of S17, the image processing apparatus 33 calculates, concerning each pixel (xy), analytical density (Arxy, Agxy, Abxy) from spectral density of r, g and b (Irxy, Igxy, Ibxy) using the conversion functions selected for each pixel (xy). Incidentally, when the first conversion function is selected, virtual analytical density (KArxy, KAgxy, KAbxy) may represent analytical density (Arxy, Agxy, Abxy) as they are.

Next, in the step of S18, the image processing apparatus 33 inputs the output signals into image forming apparatus 34 based on analytical density of r, g and b (Arxy, Agxy, Abxy) calculated, for each pixel (xy). Output signals of r, g and b (exposure amount: Erxy, Egxy, Ebxy) are calculated from the calculated analytical density of r, g and b by LUT that converts analytical density of r, g and b (Arxy, Agxy, Abxy) into output signals (exposure amount). Incidentally, the LUT that converts from analytical density of r, g and b (Ar, Ag, Ab) to output signals (exposure amount: Er, Eg, Eb) may either be prepared based on the characteristic curve between an exposure amount for each r, g and b and the analytical density, or be obtained from the relation between output signals (exposure amount: Er, Eg, Eb) and results of measurement of analytical density (Ar, Ag, Ab) measured by a densitometer. The LUT may either be obtained appropriately in each image forming apparatus, or be obtained in a production equipment for conversion function memory medium and stored in the conversion function memory medium to be used after being read by memory medium reading apparatus 39 in each image forming apparatus from a conversion function memory medium.

After that, in the step of Sl9, the image forming apparatus 34 forms an image based on inputted signals (exposure amount: Erxy, Egxy, Ebxy). The image forming apparatus 34 conducts, based on signals (exposure amount: Erxy, Egxy, Ebxy) inputted by its CRT exposure means, exposure on a photographic paper that is a silver halide color photographic light-sensitive material composed of the three primary colors of Y, M and C, and makes print 35 after processing the exposed photographic paper in its processor portion. Namely, print 35 is made by the image forming apparatus 34 based on the analytical density (Arxy, Agxy, Abxy) obtained by image processing apparatus 33.

4. Detailed Embodiment with Regard to Production of the Conversion Function

The detailed embodiment with regard to production of the conversion function will be explained with actual data. First, color chips of 28 density steps (density levels) were prepared by the following procedure. Namely, photographic paper was subjected to exposure by an image forming apparatus 24 in such a manner that the exposure amount was increased gradually by 0.075 in terms of exposure amount Log E, and the photographic paper was processed by the development process, thereby obtaining color chips 26. The color chips 26 comprised a mixed-dye image of Y+M+C with 28 density steps wherein all of 3 color dyes of Y, M and C were mixed (Ni: i=1 to 28), a mixed-dye image of Y+M with 28 density steps wherein Y and M dyes were mixed (Ri: i=1 to 28), a mixed-dye image of M+C with 28 density steps wherein M and C dyes were mixed (Bi: i=1 to 28), a mixed-dye image of C+Y with 28 density steps wherein C and Y dyes were mixed (Gi: i=1 to 28), a yellow image with 28 density steps wherein only a single Y dye was used (Yi: i=1 to 28), a magenta image with 28 density steps wherein only a single M dye was used (Mi: i=1 to 28) and a green image with 28 density steps wherein only a single C dye was used (Ci: i=1 to 28). In this case, the exposure amount of each primary color of red, green and blue for the photographic paper to form each of the single dye images of the Y image, the M image and the C image at each density level was equal to that of each primary color of red, green and blue to form the mixed-dye image of Y+M+C. Therefore, at each density step, an amount of dye used for each single dye image of the Y image, the M image and the C image was equal to that of each of the Y, M and C dyes used for the mixed-dye image of Y+M+C. Also, the exposure amount of each primary color of red, green or blue to form the mixed-dye images of Y+M, M+C, and C+Y at each density level was equal to that of each primary color of red, green and blue to form the aforesaid mixed-dye image of Y+M+C respectively. Therefore, an amount of dyes of Y, M and C used for the mixed-dye images of Y+M, M+C and C+Y was equal to that of each dye of Y, M and C used for the mixed-dye image of Y+M+C respectively.

In the above color chips 26, for the single dye images, the spectral densities of the single dye images in the complementary color wavelengths of the used dyes were measured by the spectral densitometer, whereby the analytical densities of the single dye images in the complementary color wavelength regions of the used dyes were obtained. That is, the analytical density Ari was obtained by measuring the spectral density of the color chip C in the red wavelength region, the analytical density Agi was obtained by measuring the spectral density of the color chip M in the green wavelength region, and the analytical density Abi was obtained by measuring the spectral density of the color chip Y in the blue wavelength region, respectively. In Table 1, the values of the analytical densities Ari, Agi, and Abi are indicated.

TABLE 1

| | C color chip | M color chip | Y color chip |
|---|---|---|---|
| i = | Ari | Agi | Abi |
| 1 | 0.00 | 0.00 | 0.00 |
| 2 | 0.00 | 0.00 | 0.00 |
| 3 | 0.00 | 0.00 | 0.00 |
| 4 | 0.01 | 0.00 | 0.01 |
| 5 | 0.02 | 0.01 | 0.02 |
| 6 | 0.03 | 0.02 | 0.03 |
| 7 | 0.04 | 0.03 | 0.05 |
| 8 | 0.07 | 0.05 | 0.08 |
| 9 | 0.11 | 0.09 | 0.12 |
| 10 | 0.17 | 0.15 | 0.18 |
| 11 | 0.25 | 0.22 | 0.26 |
| 12 | 0.37 | 0.33 | 0.37 |
| 13 | 0.57 | 0.51 | 0.53 |
| 14 | 0.76 | 0.67 | 0.68 |
| 15 | 0.99 | 0.85 | 0.86 |
| 16 | 1.28 | 1.09 | 1.06 |
| 17 | 1.55 | 1.31 | 1.27 |
| 18 | 1.78 | 1.51 | 1.46 |
| 19 | 1.95 | 1.68 | 1.64 |
| 20 | 2.06 | 1.81 | 1.76 |
| 21 | 2.14 | 1.90 | 1.83 |
| 22 | 2.18 | 1.95 | 1.86 |
| 23 | 2.23 | 2.00 | 1.88 |
| 24 | 2.25 | 2.02 | 1.89 |
| 25 | 2.25 | 2.05 | 1.90 |
| 26 | 2.25 | 2.07 | 1.90 |
| 27 | 2.26 | 2.08 | 1.92 |
| 28 | 2.28 | 2.08 | 1.92 |

Next, spectral data of the single dye image on the color chips (Yi, Mi, or Ci : i=1 to 28) and the mixed-dye image on the color chips (Ri, Gi, Bi or Ni : i=1 to 28) in the red, green and blue wavelength regions were measured by an image reading apparatus and then the spectral densities (IrKi, IgKi, IbKi) were obtained by converting the spectral data, wherein K represents color chips and i represents density steps (K=Y, M, C, B, G, R, or N : i=1 to 28).

As the analytical density of the mixed-dye image in the complementary color wavelength of the mixed dyes, the analytical densities measured from the single dye images formed by the same amount of the dyes corresponding to the mixed dyes were used.

Tables 2-1 to 2-7 show data arrangement in which the spectral densities of each of the single dye images in the red, green and blue wavelength regions are arranged for each density step so as to correspond to the analytical densities in the complimentary color wavelength of the dyes used in the single dye images and, also, the spectral densities of each of the mixed-dye images in the red, green and blue wavelength regions are arranged for each density step so as to correspond to the analytical densities in the complimentary color wavelength of the dyes used in the mixed-dye images.

For example, Table 2-7 shows the data arrangement of N image in which three color dyes of Y, M, and C are mixed. At the density step 17 (i=17) as shown with an arrow mark, the spectral density (IrNi) in the red wavelength region is 1.37, the spectral density (IgNi) in the green wavelength region is 1.33, and the spectral density (IbNi) in the blue wavelength region is 1.22. Further, the analytical density (Ari) in the red wavelength region corresponding to the complemental color wavelength region of the dye C is 1.55, the analytical density (Agi) in the green wavelength region corresponding to the complemental color wavelength region of the dye M is 1.31, and the analytical density (Abi) in the blue wavelength region corresponding to the complemental color wavelength region of the dye Y is 1.27.

Table 2-1
Y color chip

| i= | IrYi | IgYi | IbYi | Ari | Agi | Abi |
|---|---|---|---|---|---|---|
| 1 | 0.00 | 0.00 | 0.00 | 0 | 0 | 0.00 |
| 2 | 0.00 | 0.00 | 0.01 | 0 | 0 | 0.00 |
| 3 | 0.00 | 0.00 | 0.01 | 0 | 0 | 0.00 |
| 4 | 0.00 | 0.00 | 0.01 | 0 | 0 | 0.01 |
| 5 | 0.00 | 0.00 | 0.02 | 0 | 0 | 0.02 |
| 6 | 0.00 | 0.00 | 0.03 | 0 | 0 | 0.03 |
| 7 | 0.00 | 0.00 | 0.04 | 0 | 0 | 0.05 |
| 8 | 0.00 | 0.00 | 0.07 | 0 | 0 | 0.08 |
| 9 | 0.00 | 0.01 | 0.11 | 0 | 0 | 0.12 |
| 10 | 0.01 | 0.02 | 0.17 | 0 | 0 | 0.18 |
| 11 | 0.01 | 0.03 | 0.24 | 0 | 0 | 0.26 |
| 12 | 0.02 | 0.05 | 0.34 | 0 | 0 | 0.37 |
| 13 | 0.02 | 0.08 | 0.48 | 0 | 0 | 0.53 |
| 14 | 0.02 | 0.10 | 0.60 | 0 | 0 | 0.68 |
| 15 | 0.02 | 0.13 | 0.74 | 0 | 0 | 0.86 |
| 16 | 0.02 | 0.16 | 0.87 | 0 | 0 | 1.06 |
| 17 | 0.03 | 0.19 | 0.99 | 0 | 0 | 1.27 |
| 18 | 0.03 | 0.22 | 1.09 | 0 | 0 | 1.46 |
| 19 | 0.05 | 0.25 | 1.16 | 0 | 0 | 1.64 |
| 20 | 0.05 | 0.27 | 1.22 | 0 | 0 | 1.76 |
| 21 | 0.06 | 0.28 | 1.25 | 0 | 0 | 1.83 |
| 22 | 0.06 | 0.29 | 1.26 | 0 | 0 | 1.86 |
| 23 | 0.07 | 0.29 | 1.27 | 0 | 0 | 1.88 |
| 24 | 0.07 | 0.30 | 1.27 | 0 | 0 | 1.89 |
| 25 | 0.07 | 0.30 | 1.28 | 0 | 0 | 1.90 |
| 26 | 0.07 | 0.30 | 1.28 | 0 | 0 | 1.90 |
| 27 | 0.07 | 0.30 | 1.28 | 0 | 0 | 1.92 |
| 28 | 0.07 | 0.30 | 1.28 | 0 | 0 | 1.92 |

Table 2-2
M color chip

| i= | IrMi | IgMi | IbMi | Ari | Agi | Abi |
|---|---|---|---|---|---|---|
| 1 | 0.00 | 0.00 | 0.00 | 0 | 0.00 | 0 |
| 2 | 0.00 | 0.00 | 0.00 | 0 | 0.00 | 0 |
| 3 | 0.00 | 0.00 | 0.00 | 0 | 0.00 | 0 |
| 4 | 0.00 | 0.00 | 0.00 | 0 | 0.00 | 0 |
| 5 | 0.00 | 0.01 | 0.00 | 0 | 0.01 | 0 |
| 6 | 0.00 | 0.02 | 0.00 | 0 | 0.02 | 0 |
| 7 | 0.00 | 0.03 | 0.00 | 0 | 0.03 | 0 |
| 8 | 0.01 | 0.05 | 0.00 | 0 | 0.05 | 0 |
| 9 | 0.01 | 0.09 | 0.01 | 0 | 0.09 | 0 |
| 10 | 0.02 | 0.14 | 0.03 | 0 | 0.15 | 0 |
| 11 | 0.04 | 0.21 | 0.04 | 0 | 0.22 | 0 |
| 12 | 0.06 | 0.32 | 0.08 | 0 | 0.33 | 0 |
| 13 | 0.10 | 0.47 | 0.13 | 0 | 0.51 | 0 |
| 14 | 0.14 | 0.60 | 0.18 | 0 | 0.67 | 0 |
| 15 | 0.18 | 0.76 | 0.23 | 0 | 0.85 | 0 |
| 16 | 0.22 | 0.91 | 0.28 | 0 | 1.09 | 0 |
| 17 | 0.25 | 1.04 | 0.34 | 0 | 1.31 | 0 |
| 18 | 0.28 | 1.12 | 0.38 | 0 | 1.51 | 0 |
| 19 | 0.30 | 1.18 | 0.42 | 0 | 1.68 | 0 |
| 20 | 0.33 | 1.20 | 0.45 | 0 | 1.81 | 0 |
| 21 | 0.34 | 1.23 | 0.47 | 0 | 1.90 | 0 |
| 22 | 0.34 | 1.26 | 0.48 | 0 | 1.95 | 0 |
| 23 | 0.35 | 1.29 | 0.49 | 0 | 2.00 | 0 |
| 24 | 0.36 | 1.29 | 0.51 | 0 | 2.02 | 0 |
| 25 | 0.37 | 1.29 | 0.52 | 0 | 2.05 | 0 |
| 26 | 0.38 | 1.33 | 0.55 | 0 | 2.07 | 0 |
| 27 | 0.39 | 1.33 | 0.58 | 0 | 2.08 | 0 |
| 28 | 0.41 | 1.33 | 0.61 | 0 | 2.08 | 0 |

Table 2-3
C Color chip

| i= | IrCi | IgCi | IbCi | Ari | Agi | Abi |
|---|---|---|---|---|---|---|
| 1 | 0.00 | 0.00 | 0.00 | 0.00 | 0 | 0 |
| 2 | 0.00 | 0.00 | 0.00 | 0.00 | 0 | 0 |
| 3 | 0.00 | 0.00 | 0.00 | 0.00 | 0 | 0 |
| 4 | 0.01 | 0.00 | 0.00 | 0.01 | 0 | 0 |
| 5 | 0.02 | 0.00 | 0.00 | 0.02 | 0 | 0 |
| 6 | 0.03 | 0.00 | 0.00 | 0.03 | 0 | 0 |
| 7 | 0.04 | 0.00 | 0.00 | 0.04 | 0 | 0 |
| 8 | 0.07 | 0.01 | 0.00 | 0.07 | 0 | 0 |
| 9 | 0.11 | 0.02 | 0.01 | 0.11 | 0 | 0 |
| 10 | 0.17 | 0.04 | 0.02 | 0.17 | 0 | 0 |
| 11 | 0.24 | 0.07 | 0.03 | 0.25 | 0 | 0 |
| 12 | 0.37 | 0.11 | 0.05 | 0.37 | 0 | 0 |
| 13 | 0.54 | 0.18 | 0.08 | 0.57 | 0 | 0 |
| 14 | 0.70 | 0.24 | 0.11 | 0.76 | 0 | 0 |
| 15 | 0.87 | 0.32 | 0.15 | 0.99 | 0 | 0 |
| 16 | 1.05 | 0.39 | 0.19 | 1.28 | 0 | 0 |
| 17 | 1.19 | 0.45 | 0.23 | 1.55 | 0 | 0 |
| 18 | 1.28 | 0.50 | 0.26 | 1.78 | 0 | 0 |
| 19 | 1.34 | 0.54 | 0.28 | 1.95 | 0 | 0 |
| 20 | 1.38 | 0.57 | 0.30 | 2.06 | 0 | 0 |
| 21 | 1.40 | 0.59 | 0.31 | 2.14 | 0 | 0 |
| 22 | 1.41 | 0.59 | 0.32 | 2.18 | 0 | 0 |
| 23 | 1.43 | 0.61 | 0.33 | 2.23 | 0 | 0 |
| 24 | 1.43 | 0.61 | 0.33 | 2.25 | 0 | 0 |
| 25 | 1.44 | 0.61 | 0.33 | 2.25 | 0 | 0 |
| 26 | 1.45 | 0.61 | 0.33 | 2.25 | 0 | 0 |
| 27 | 1.45 | 0.62 | 0.33 | 2.26 | 0 | 0 |
| 28 | 1.45 | 0.62 | 0.33 | 2.28 | 0 | 0 |

Table 2-4
R color chip (Y + M)

| i= | IrRi | IgRi | IbRi | Ari | Agi | Abi |
|---|---|---|---|---|---|---|
| 1 | 0.00 | 0.00 | 0.00 | 0 | 0.00 | 0.00 |
| 2 | 0.00 | 0.00 | 0.00 | 0 | 0.00 | 0.00 |
| 3 | 0.00 | 0.00 | 0.00 | 0 | 0.00 | 0.00 |
| 4 | 0.00 | 0.00 | 0.01 | 0 | 0.00 | 0.01 |
| 5 | 0.00 | 0.01 | 0.02 | 0 | 0.01 | 0.02 |
| 6 | 0.00 | 0.02 | 0.02 | 0 | 0.02 | 0.03 |
| 7 | 0.01 | 0.04 | 0.05 | 0 | 0.03 | 0.05 |
| 8 | 0.01 | 0.07 | 0.09 | 0 | 0.05 | 0.08 |
| 9 | 0.02 | 0.12 | 0.14 | 0 | 0.09 | 0.12 |
| 10 | 0.03 | 0.18 | 0.21 | 0 | 0.15 | 0.18 |
| 11 | 0.05 | 0.26 | 0.29 | 0 | 0.22 | 0.26 |
| 12 | 0.08 | 0.38 | 0.41 | 0 | 0.33 | 0.37 |
| 13 | 0.12 | 0.54 | 0.56 | 0 | 0.51 | 0.53 |
| 14 | 0.15 | 0.68 | 0.67 | 0 | 0.67 | 0.68 |
| 15 | 0.20 | 0.85 | 0.81 | 0 | 0.85 | 0.86 |
| 16 | 0.24 | 1.02 | 0.93 | 0 | 1.09 | 1.06 |
| 17 | 0.28 | 1.17 | 1.02 | 0 | 1.31 | 1.27 |
| 18 | 0.31 | 1.25 | 1.08 | 0 | 1.51 | 1.46 |
| 19 | 0.34 | 1.31 | 1.13 | 0 | 1.68 | 1.64 |
| 20 | 0.37 | 1.35 | 1.17 | 0 | 1.81 | 1.76 |
| 21 | 0.39 | 1.36 | 1.19 | 0 | 1.90 | 1.83 |
| 22 | 0.39 | 1.36 | 1.20 | 0 | 1.95 | 1.86 |
| 23 | 0.40 | 1.40 | 1.21 | 0 | 2.00 | 1.88 |
| 24 | 0.41 | 1.42 | 1.21 | 0 | 2.02 | 1.89 |
| 25 | 0.42 | 1.43 | 1.21 | 0 | 2.05 | 1.90 |
| 26 | 0.43 | 1.44 | 1.22 | 0 | 2.07 | 1.90 |
| 27 | 0.45 | 1.45 | 1.23 | 0 | 2.08 | 1.92 |
| 28 | 0.47 | 1.45 | 1.23 | 0 | 2.08 | 1.92 |

Table 2-5
B color chip (M + C)

| i= | IrBi | IgBi | IbBi | Ari | Agi | Abi |
|---|---|---|---|---|---|---|
| 1 | 0.00 | 0.00 | 0.00 | 0.00 | 0.00 | 0 |
| 2 | 0.00 | 0.00 | 0.00 | 0.00 | 0.00 | 0 |
| 3 | 0.00 | 0.00 | 0.00 | 0.00 | 0.00 | 0 |
| 4 | 0.01 | 0.00 | 0.00 | 0.01 | 0.00 | 0 |
| 5 | 0.02 | 0.01 | 0.00 | 0.02 | 0.01 | 0 |
| 6 | 0.03 | 0.02 | 0.00 | 0.03 | 0.02 | 0 |
| 7 | 0.05 | 0.04 | 0.00 | 0.04 | 0.03 | 0 |

Table 2-6
G color chip (C + Y)

| i= | IrGi | IgGi | IbGi | Ari | Agi | Abi |
|---|---|---|---|---|---|---|
| 1 | 0.00 | 0.00 | 0.00 | 0.00 | 0 | 0.00 |
| 2 | 0.00 | 0.00 | 0.00 | 0.00 | 0 | 0.00 |
| 3 | 0.00 | 0.00 | 0.00 | 0.00 | 0 | 0.00 |
| 4 | 0.01 | 0.00 | 0.01 | 0.01 | 0 | 0.01 |
| 5 | 0.02 | 0.00 | 0.02 | 0.02 | 0 | 0.02 |
| 6 | 0.03 | 0.00 | 0.03 | 0.03 | 0 | 0.03 |
| 7 | 0.05 | 0.01 | 0.05 | 0.04 | 0 | 0.05 |

-continued

| | | | | | | | | | | | | |
|---|---|---|---|---|---|---|---|---|---|---|---|---|
| 8 | 0.08 | 0.07 | 0.01 | 0.07 | 0.05 | 0 | 0.07 | 0.02 | 0.08 | 0.07 | 0 | 0.08 |
| 9 | 0.13 | 0.11 | 0.03 | 0.11 | 0.09 | 0 | 0.11 | 0.04 | 0.13 | 0.11 | 0 | 0.12 |
| 10 | 0.20 | 0.18 | 0.05 | 0.17 | 0.15 | 0 | 0.17 | 0.07 | 0.20 | 0.17 | 0 | 0.18 |
| 11 | 0.28 | 0.26 | 0.08 | 0.25 | 0.22 | 0 | 0.25 | 0.11 | 0.27 | 0.25 | 0 | 0.26 |
| 12 | 0.41 | 0.39 | 0.13 | 0.37 | 0.33 | 0 | 0.37 | 0.17 | 0.38 | 0.37 | 0 | 0.37 |
| 13 | 0.60 | 0.56 | 0.21 | 0.57 | 0.51 | 0 | 0.55 | 0.26 | 0.54 | 0.57 | 0 | 0.53 |
| 14 | 0.78 | 0.72 | 0.28 | 0.76 | 0.67 | 0 | 0.72 | 0.34 | 0.67 | 0.76 | 0 | 0.68 |
| 15 | 0.96 | 0.88 | 0.36 | 0.99 | 0.85 | 0 | 0.91 | 0.43 | 0.82 | 0.99 | 0 | 0.86 |
| 16 | 1.15 | 1.05 | 0.45 | 1.28 | 1.09 | 0 | 1.11 | 0.52 | 0.97 | 1.28 | 0 | 1.06 |
| 17 | 1.29 | 1.18 | 0.51 | 1.55 | 1.31 | 0 | 1.29 | 0.61 | 1.09 | 1.55 | 0 | 1.27 |
| 18 | 1.37 | 1.27 | 0.58 | 1.78 | 1.51 | 0 | 1.41 | 0.68 | 1.19 | 1.78 | 0 | 1.46 |
| 19 | 1.43 | 1.32 | 0.64 | 1.95 | 1.68 | 0 | 1.50 | 0.75 | 1.29 | 1.95 | 0 | 1.64 |
| 20 | 1.48 | 1.38 | 0.68 | 2.06 | 1.81 | 0 | 1.53 | 0.79 | 1.36 | 2.06 | 0 | 1.76 |
| 21 | 1.48 | 1.39 | 0.71 | 2.14 | 1.90 | 0 | 1.57 | 0.82 | 1.38 | 2.14 | 0 | 1.83 |
| 22 | 1.50 | 1.42 | 0.73 | 2.18 | 1.95 | 0 | 1.57 | 0.84 | 1.39 | 2.18 | 0 | 1.86 |
| 23 | 1.52 | 1.44 | 0.75 | 2.23 | 2.00 | 0 | 1.59 | 0.85 | 1.40 | 2.23 | 0 | 1.88 |
| 24 | 1.52 | 1.44 | 0.75 | 2.25 | 2.02 | 0 | 1.59 | 0.85 | 1.40 | 2.25 | 0 | 1.89 |
| 25 | 1.52 | 1.44 | 0.76 | 2.25 | 2.05 | 0 | 1.60 | 0.85 | 1.42 | 2.25 | 0 | 1.90 |
| 26 | 1.52 | 1.44 | 0.78 | 2.25 | 2.07 | 0 | 1.60 | 0.85 | 1.43 | 2.25 | 0 | 1.90 |
| 27 | 1.52 | 1.44 | 0.79 | 2.26 | 2.08 | 0 | 1.61 | 0.86 | 1.43 | 2.26 | 0 | 1.92 |
| 28 | 1.52 | 1.45 | 0.81 | 2.28 | 2.08 | 0 | 1.61 | 0.86 | 1.43 | 2.28 | 0 | 1.92 |

Table 2-7
N color chip (Y + M + C)

| i= | IrNi | IgNi | IbNi | Ari | Agi | Abi |
|---|---|---|---|---|---|---|
| 1 | 0.00 | 0.00 | 0.00 | 0.00 | 0.00 | 0.00 |
| 2 | 0.00 | 0.00 | 0.00 | 0.00 | 0.00 | 0.00 |
| 3 | 0.00 | 0.00 | 0.00 | 0.00 | 0.00 | 0.00 |
| 4 | 0.01 | 0.01 | 0.01 | 0.01 | 0.00 | 0.01 |
| 5 | 0.02 | 0.02 | 0.02 | 0.02 | 0.01 | 0.02 |
| 6 | 0.03 | 0.03 | 0.04 | 0.03 | 0.02 | 0.03 |
| 7 | 0.05 | 0.05 | 0.06 | 0.04 | 0.03 | 0.05 |
| 8 | 0.09 | 0.08 | 0.09 | 0.07 | 0.05 | 0.08 |
| 9 | 0.14 | 0.14 | 0.15 | 0.11 | 0.09 | 0.12 |
| 10 | 0.21 | 0.21 | 0.22 | 0.17 | 0.15 | 0.18 |
| 11 | 0.29 | 0.30 | 0.31 | 0.25 | 0.22 | 0.26 |
| 12 | 0.43 | 0.44 | 0.44 | 0.37 | 0.33 | 0.37 |
| 13 | 0.63 | 0.63 | 0.61 | 0.57 | 0.51 | 0.53 |
| 44 | 0.81 | 0.80 | 0.77 | 0.76 | 0.67 | 0.68 |
| 15 | 1.01 | 0.99 | 0.93 | 0.99 | 0.85 | 0.86 |
| 16 | 1.21 | 1.18 | 1.09 | 1.28 | 1.09 | 1.06 |
| 17 | 1.37 | 1.33 | 1.22 | 1.55 | 1.31 | 1.27 |
| 18 | 1.47 | 1.43 | 1.32 | 1.78 | 1.51 | 1.46 |
| 19 | 1.52 | 1.48 | 1.38 | 1.95 | 1.68 | 1.64 |
| 20 | 1.54 | 1.50 | 1.43 | 2.06 | 1.81 | 1.76 |
| 21 | 1.56 | 1.52 | 1.45 | 2.14 | 1.90 | 1.83 |
| 22 | 1.58 | 1.53 | 1.46 | 2.18 | 1.95 | 1.86 |
| 23 | 1.60 | 1.54 | 1.47 | 2.23 | 2.00 | 1.88 |
| 24 | 1.60 | 1.54 | 1.47 | 2.25 | 2.02 | 1.89 |
| 25 | 1.60 | 1.54 | 1.47 | 2.25 | 2.05 | 1.90 |
| 26 | 1.61 | 1.54 | 1.47 | 2.25 | 2.07 | 1.90 |
| 27 | 1.61 | 1.54 | 1.47 | 2.26 | 2.08 | 1.92 |
| 28 | 1.61 | 1.54 | 1.47 | 2.28 | 2.08 | 1.92 |

From the spectral densities and the analytical densities indicated in Tables 2-1 to 2-7, the converting function to convert the spectral densities into the analytical densities throughout all density steps can be obtained by multiple regression analysis. As the preferable example of the converting function, the matrix function (3×3) with an error term obtained by the multiple regression analysis is indicated below:

$$\begin{pmatrix} A_r \\ A_g \\ A_b \end{pmatrix} = \begin{pmatrix} 1.49749 & -0.28749 & -0.13153 \\ -0.15368 & 1.57242 & -0.49158 \\ 0.33366 & -0.55082 & 1.27616 \end{pmatrix} \begin{pmatrix} I_r \\ I_g \\ I_b \end{pmatrix} + \begin{pmatrix} -0.03219 \\ -0.03333 \\ -0.03008 \end{pmatrix}$$

5. Prererable Embodiment of the Present Invention

It is preferable that a color image is a print whose spectral coloring characteristics are the same as those of color chip 26 because its image reproduction is best.

A densitometer is one for measuring analytical density corresponding to an amount of dyes of a print, and it is possible to use those ranging from a spectrophotometer to one wherein densities of optimum spectral areas are integrated from spectral absorption characteristics of each dye of yellow, magenta and cyan of the print and thereby the density is obtained.

As an image reading apparatus, it is possible to use a color image scanner wherein a color reflection original is fixed, a 5000-pixel CCD linear image sensor having on its incident light side each of B, G and R filters is provided for each of B, G and R for primary scanning, and an optical unit consisting of these CCD linear image sensors and a diffusion box diffusing a linear light source and light from the linear light source is moved in the direction perpendicular to the direction of arrangement of these CCDs for sub-scanning. Owing to this, light emitted from the linear light source is changed by the diffusion box to diffused light which illuminates a color reflection original and reflected light from the illuminated color reflection original enters each of B, G and R CCD linear image sensors for the photometry of the color reflection original, thus, reflection density of each pixel can be obtained. It is preferable, on the point of spectral transmission characteristics, that each of B, G and R filters of the image reading apparatus hardly transmits light that is out of each wavelength area for B, G and R.

As an image forming apparatus, it is possible to use a CRT printer processor wherein a CRT printer in which a photographic paper is exposed to an image of input signals through the CRT and an automatic processor for processing the photographic paper are united integrally. The CRT is a black-and-white CRT having brightness for any of B, G and R wavelength areas and it gives exposure of each color of B, G and R when each of B, G and R filters is inserted in or removed from the exposure light path.

It is therefore preferable that the spectral transmission characteristics of B, G and R filters of a CRT printer processor are those wherein only light belonging to a wavelength area having less influence of secondary absorption among spectral sensitivity characteristics of B, G and R light-sensitive layers of a photographic paper can be transmitted.

It is possible to obtain a conversion function under precise conditions in advance in a way wherein an apparatus producing a conversion function and an image forming apparatus are provided separately and an image forming apparatus having spectral coloring characteristics identical to those of the aforesaid image forming apparatus is used in a factory or a sales agent. Then the conversion function thus obtained is stored in a conversion function memory medium and the conversion function memory medium is supplied to an image forming apparatus of an end user so that the conversion function read out of the conversion function memory means can be used in obtaining analytical density from spectral density on the image forming apparatus of the end user.

6. Effects of the Examples

Owing to the example of the invention, a color image read by an image reading apparatus by the use of reflected light through simple operation can be reproduced with high fidelity.

Since Y image, M image and C image each having plural density levels (15 levels) as well as a plurality of mixed-dye images are prepared and used, in particular, a print made by the image forming apparatus has more data than one having only one level, and data can be obtained from various densities. Therefore, a color image read by an image reading apparatus by the use of reflected light can be reproduced with high fidelity on the print. As the number of density levels, 3 or more is preferable for the reasons mentioned above, and 80 or less is preferable from the viewpoint of the aforesaid effects such as saturation, an amount of operation and an accuracy of controlling density.

Since the conversion function for obtaining analytical density from spectral density is obtained based on the relation between spectral density obtained by the aforesaid image reading apparatus and analytical density measured by a densitometer for each of 7 density levels, a color image read by the image reading apparatus can be reproduced with more fidelity on a print made by the image forming apparatus even in the case where the relation between spectral density and analytical density varies depending on the density. When a density area is fractionated at a high density area side as in the present example, it is effective, in particular, in the system where influence of secondary absorption of dyes varies in the high density area such as a print made from a silver halide photographic light-sensitive material through processing and a print of a dye-dyeing type.

Since dyes in 3 kinds of Y, M and C are used for a color image and a print in the present example, no special processing such as portioning to K dyes is needed, which is different from the case where a print is composed of 4 colors of Y, M, C and black (K dye).

Since there are made by an image forming apparatus a Y image, an M image, a C image, a Y+M+C mixed-dye image wherein an amount of each of Y, M and C dyes is equal to a dye amount of each of Y image, M image and C image, and a Y+M mixed-dye image, an M+C mixed-dye image and a C+Y mixed-dye image in each of which two types of dyes equal respectively to two of Y image, M image and C image in terms of amount are mixed C+Y, and they are used, a color image read by an image reading apparatus by the use of reflected light can be reproduced on a print made by the image forming apparatus with high fidelity including also intermediate colors.

Further, since a half-value width of spectral sensitivity distribution for each primary color does not overlap each other in a densitometer, it is possible to eliminate sufficiently an influence of secondary absorption in measurement of analytical density. Therefore, analytical density with higher accuracy can be obtained, resulting in that a color image read by an image reading apparatus by the use of reflected light can be reproduced with high fidelity on a print made by the image forming apparatus.

As a variation of the example, an image reading apparatus may serve also as a densitometer. In this case, simple structure of an apparatus is realized. In particular, when a half-value width of spectral sensitivity distribution for each primary color does not overlap each other in the image reading apparatus, it is possible to eliminate sufficiently an influence of other primary colors even in the case of measurement of spectral density. Therefore, spectral density with higher accuracy can be obtained, resulting in that a color image read by an image reading apparatus by the use of reflected light can be reproduced with high fidelity on a print made by the image forming apparatus.

When the aforesaid conversion function is obtained through a multiple regression analysis from the relation between the obtained spectral density and the analytical density, accuracy under which the conversion function is obtained from the relation between the obtained spectral density and the analytical density is high, resulting in that a color image read by an image reading apparatus by the use of reflected light can be reproduced with high fidelity on a print made by the image forming apparatus.

Since the aforesaid print is a processed silver halide photographic light-sensitive material, color fading of a prepared print is small. Therefore, even when a long time from the preparation of a color chip by an image forming apparatus up to measurement of analytical density made by a densitometer or reading by an image reading apparatus is required, the print made by the image forming apparatus can reproduce with sufficient fidelity the color image read by the image reading apparatus through reflected light. Therefore, when there is used a color chip prepared with a print having the same spectral coloring characteristic as that of the print formed by the image forming apparatus, it is not necessary to prepare a color chip by the image forming apparatus and it is possible to simplify the operation for obtaining the conversion function for obtaining analytical density from spectral density, thus the conversion function can be easily obtained.

Further, when conversion function for obtaining analytical density from spectral density are stored in a conversion function memory medium and they are supplied to more image forming apparatuses, prints made by more image forming apparatuses can reproduce, with fidelity, color images read by an image reading apparatus through reflected light, even when the conversion function for obtaining analytical density from spectral density is not obtained by an individual image forming apparatus.

In particular, owing to an image production method to read a color image with an image reading apparatus, then to obtain analytical density from the spectral density of each primary color of red, green and blue read by the image reading apparatus, and to make a print with an image forming apparatus based on the obtained analytical density, wherein analytical density is obtained from the spectral density of each primary color of red, green and blue read by the image reading apparatus based on the conversion function for obtaining analytical density from spectral density obtained by the method for determining a conversion function for obtaining analytical density from spectral density, by using an image reading apparatus having the same spectral sensitivity characteristic as that of the aforesaid image reading apparatus and an image forming apparatus that makes a print having the same spectral coloring characteristic as that of the print made by the aforesaid image forming apparatus, it is possible for the print made by an image forming apparatus in accordance with the conversion function for obtaining analytical density from spectral density obtained by other image reading apparatus and image forming apparatus to reproduce with fidelity the color image read by an image reading apparatus through reflected light, when using an image reading apparatus having the same spectral sensitivity characteristic as that of the aforesaid image reading apparatus and an image forming apparatus that makes a print having the same spectral coloring characteristic as that of the print made by the aforesaid image forming apparatus. Accordingly, when the conversion function for obtaining analytical density from spectral density is obtained in advance by an image reading apparatus having the same spectral sensitivity characteristic as that of the aforesaid image reading apparatus and by an image forming apparatus that makes a print having the same spectral coloring characteristic as that of the print made by the aforesaid image forming apparatus, an operation for obtaining the conversion function for obtaining analytical density from spectral density may be omitted.

7. Variation of the Example

Incidentally, in the steps of S15 and S16 of (3. Method of producing prints on an image forming apparatus] in the present example, color h (h is any of r, g and b) with maximum density in virtual analytical density (KArxy, KAgxy, KAbxy) is selected from plural conversion functions, then appropriate conversion function is selected based on virtual analytical density (KAhxy) of the selected color h, and analysis densities (Arxy, Agxy, Abxy) are obtained based on the selected conversion functions. As a variation, however, conversion functions may be selected based on photometry densities (Irxy, Igxy, Ibxy), or they may be selected based on average densities (KArxy+KAgxy+KAbxy)/3 of three primary colors of red, green and blue, or it is acceptable that one conversion function only is prepared in advance and it is used.

A color image can reproduce an image most satisfactorily when it is a print having the same spectral coloring characteristics as those of color chip 26. However, any color image is acceptable if it can be read through reflected light, and it includes a silver halide color photographic print, and printed matters made by a printing ink, an ink jet printer or a thermal transfer printer of a sublimating type.

A densitometer is for measuring analytical density corresponding to an amount of dyes on a print, and one that measures an amount of reflected light in specific wavelength area limited by a filter, or one that measures an amount of reflected light in a specific wavelength range limited by the selection of a light source, or others such as a spectrophotometer are acceptable.

In the example, an image reading apparatus is a color image scanner that has linear image sensors for B, G and R and sub-scans a color image. As an image reading apparatus, an apparatus that reads an image through reflected light is satisfactory, and a color image scanner provided with a linear image sensor or a 2-dimensional image sensor, or a fixed digital camera are given. Further, an image reading apparatus may also be incorporated in an image processing apparatus or in an image forming apparatus integrally.

An image forming apparatus includes not only an apparatus making a print independently such as a thermal transfer printer of a sublimating type, a thermal transfer printer of a melting type, an electrophotographic printer, an ink jet printer, a printing apparatus, and a CRT printer processor, but also one composed of plural apparatuses such as a combination of a thermal transfer color negative printer of a sublimating type that makes a color negative from input signals and a printer processor that makes a print from the color negative made, or a combination of a CRT printer that exposes a photographic paper with an image from input signals by the use of a CRT and an automatic processor that processes the photographic paper, or a combination of a digital film recorder exposes a color negative film with an image from input signals by the use of a CRT, a film processor that processes the exposed color negative film and a printer processor that makes a print from the processed color negative film.

As a print, there are given a print of a thermal transfer printer of a sublimating type, a print of a print of a thermal transfer printer of a melting type, a print of an electrophotographic printer, a print of an ink jet printer, a print of a printing apparatus, a print of a photographic paper made by an automatic processor through processing after being exposed to an image from input signals through a CRT, and a print made by a printer processor from a color negative made from input signals by a thermal transfer printer of a sublimating type.

There will be explained an example wherein the invention is applied to a combination of a thermal transfer color negative printer of a sublimating type that makes a color negative from input signals and a printer processor that makes a print from the color negative made.

Figure 10:
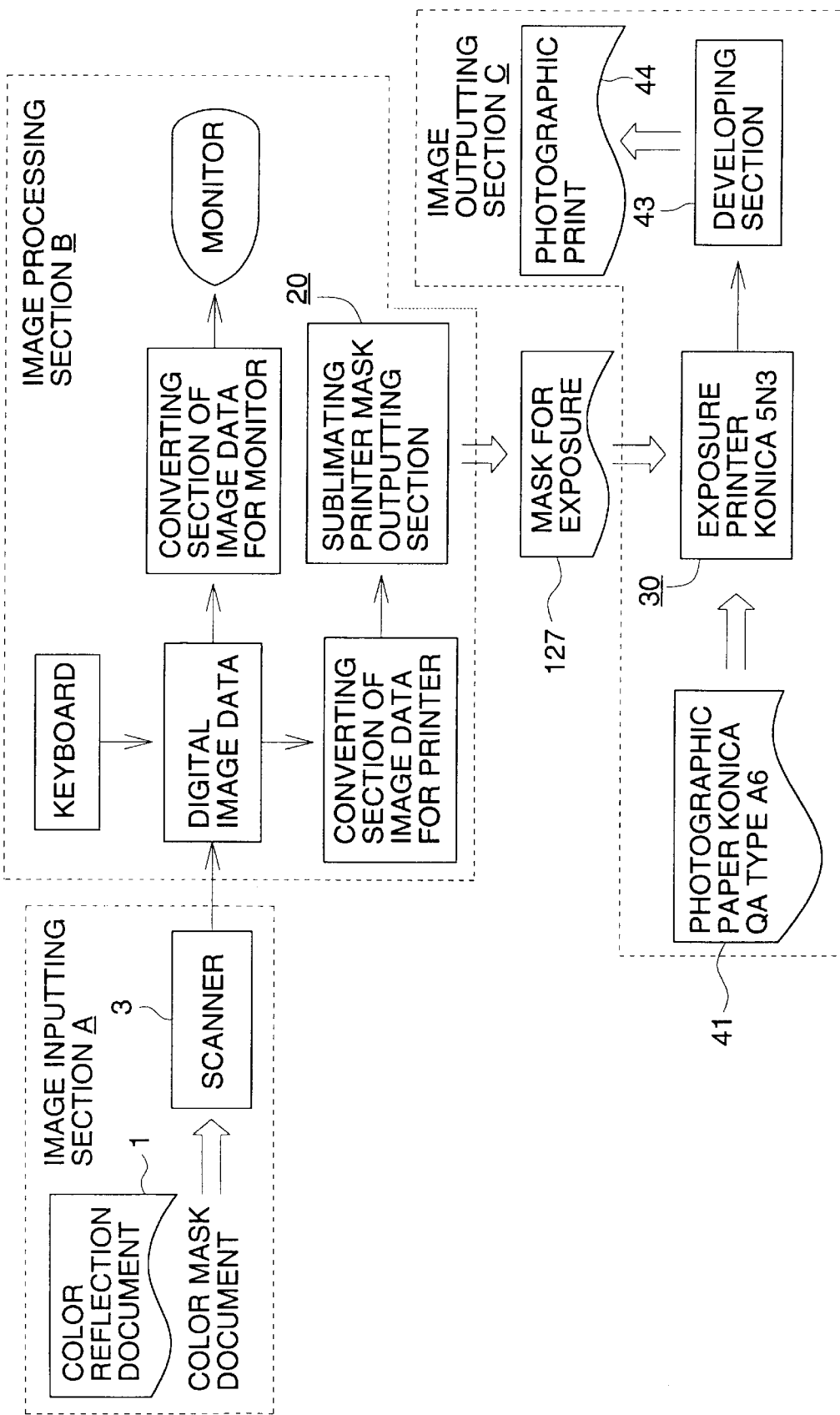
FIG. 10 is a schematic structural diagram of primary portions of a color image forming system in the example of the invention.

FIG. 10 represents a schematic construction diagram of primary parts of a color image forming system employing an example of the invention. The color image forming system is composed of image inputting section A, image processing section B and image outputting section C. To be concrete, the image inputting section A is represented by a scanner device, the image processing section B is composed of a personal computer and a sublimation printer serving as a CRT monitor and a mask outputting section, and the image outputting section C is composed of an exposure printer and a processing device.

In the image processing section A, a color mask document is read and image data are converted to digital data. In the image processing section B, the image data are subjected to color matching processing based on the characteristics data shown below so that the color mask document can be reproduced on a photographic print in terms of colors, and a mask for exposure is outputted.

(i) Characteristics of a scanner (ii) Characteristics of a sublimation printer and sublimation dyes (iii) Characteristics of a photographic paper (iv) Exposure conditions of an exposure printer (v) Conditions of development In the image outputting section C, exposure of a photographic print is carried out based on the prepared exposure mask.

Each section will be explained in detail as follows.

First, in the image inputting section A, reflection document 1 (printed matter, silver salt photographic print, etc.) which is a document (hereinafter referred to as a mask document) for making a mask for exposure is subjected to optical scanning conducted by each scanner 3. An A/D converter of the scanner converts analog image signals to 8-bit digital image data and sends them to the image processing section B.

Next, processing in the image processing section B will be explained.

Figure 11:
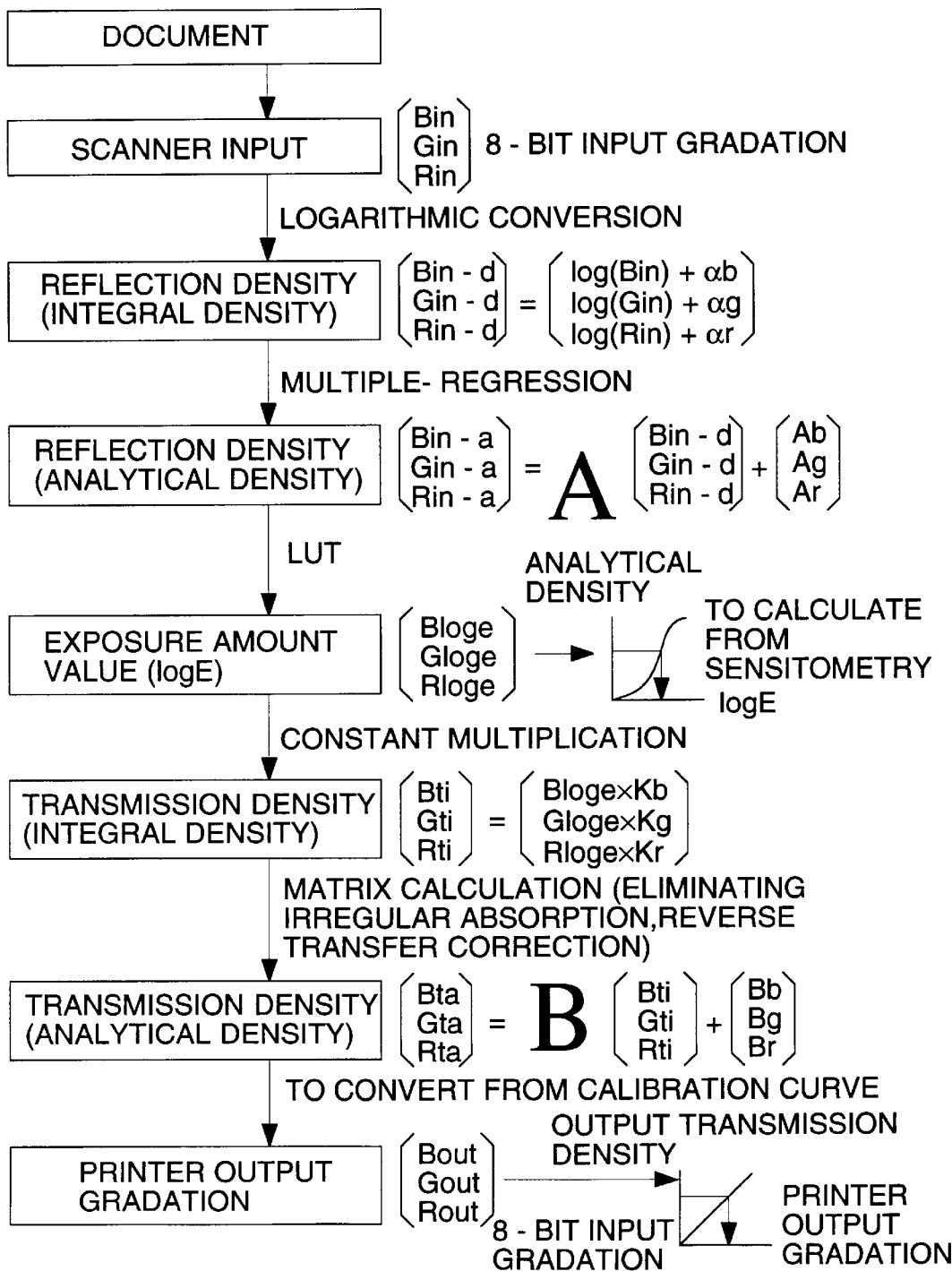
FIG. 11 is a detailed block diagram of an image data editing portion in the aforesaid example.

As shown in FIG. 11 of a detailed block diagram, data conversion is carried out in the sequence shown below 1. Image digital data are converted to LOG values (integral density values).

2. From the integral density values, analyzed density values are calculated through 3×3 matrix operation. A 3×3 matrix is one prepared in advance by reading 28 steps of each wedge for Y, M, C, B(M+C), G(C+Y), R(Y+M) and Grey(Y+M+C) and comparing the results of the reading with measurements obtained by a standard densitometer (X Light Status A, made by X Light Inc.) for calculation.

3. From the characteristics curve (exposure amount vs. analyzed density) of a photographic paper (Konica QA Paper Type A6), a value of exposure amount for a photographic paper is obtained from a analyzed density.

4. Conversion (constant-fold) from the value of exposure amount to integrated transmission density obtained by a standard densitometer (X Light Status M, made by X Light Inc.) is performed.

5. From the integrated transmission density values, analyzed transmission density values are calculated through 3×3 matrix operation. Through this operation, the values wherein incorrect absorption and inverse transfer for sublimating dyes are corrected are calculated. The 3×3 matrix outputs 14 steps having output gradation level values of 0 through 255 for Y, M, C, B(M+C), G(C+Y), R(Y+M) and Grey(Y+M+C) as an exposure mask, and the analyzed transmission density value of the exposure mask is calculated from the value obtained through measurement of transmission density conducted by a standard densitometer (X Light Status M, made by X Light Inc.).

6. Output gradation level values are obtained from analyzed transmission density values based on data in FIG. 14.

On the exposure printer, the exposure conditions for auxiliary exposure are established so that reflection density of an image formed on a photographic paper may show 0.8 (X Light Status A, made by X Light Inc.) when a photographic paper (Konica QA Paper Type A6) is exposed through an exposure mask having transmission density of Y=M=C=1.0 (X Light Status M, made by X Light Inc.) and then is processed.

Asymmetric absorption together with mask for exposure 127 will be explained as follows, referring to FIG. 12.

Figure 12:
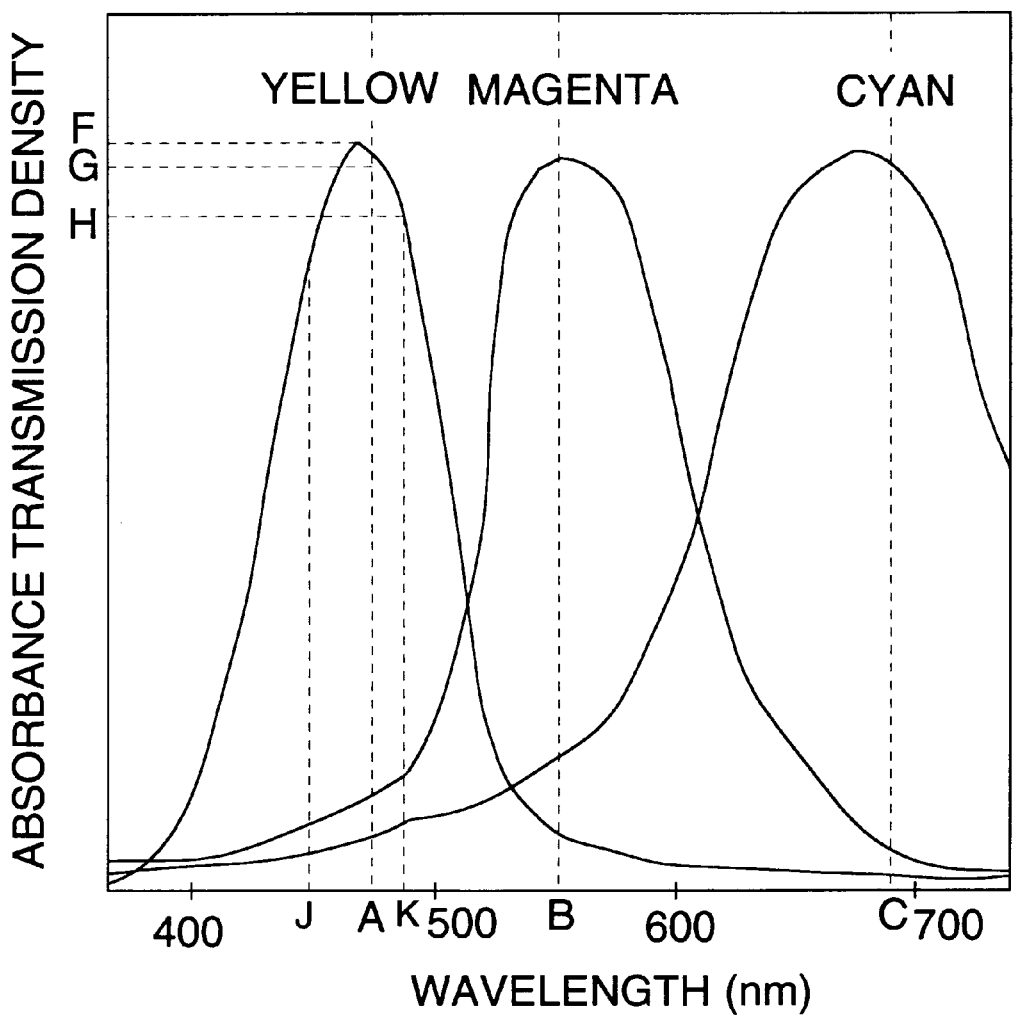
FIG. 12 is a diagram showing a light-transmission spectrum of a mask for exposure in the aforesaid example.

FIG. 12 shows a light-transmission spectrum of mask for exposure 127, and the axis of ordinates represents light absorbance (transmission density), while the axis of abscissas represents a wavelength of light. Wavelengths corresponding respectively to maximum spectral sensitivity values of regular, orthochromatic and panchromatic of photographic paper 41 are assumed to be A[nm], B [nm] and C [nm], and each layer contains dyes coloring to each of blue (B), green (G) and red (R). Namely, the photographic paper 41 is exposed through a transmitting filter of the mask for exposure 127 by the use of a white light source, and for the mask for exposure of Y, dyes of M and C are subjected to subtractive color mixture by G and R light transmitted through the aforesaid mask, resulting in coloring of B, for the mask for exposure of M, dyes of Y and C are subjected to subtractive color mixture by B and R light transmitted through the aforesaid mask, resulting in coloring of G, and for the mask for exposure of C, dyes of Y and M are subjected to subtractive color mixture by B and G light transmitted through the aforesaid mask, resulting in coloring of R.

Therefore, when coloring characteristics of the photographic paper 41 corresponding to an amount of light (in other words, transmission density) transmitted through the mask for exposure 127 for each color are adjusted, it is possible to enhance reproduction on the photographic paper 41. Transmission densities for Y, M and C colors on the mask for exposure 127 used in the present example are 2.0, 2.0 and 2.0 respectively in maximum sensitivity wavelengths of 470 (A) [nm], 550 (B) [nm] and 690 (C) [nm] of photographic paper 41 (Konica's Konica QA Paper Type A6) to be used.

The mask for exposure 127 for each of Y, M and C has absorption in a main absorption wavelength area of other dye, and this is what is called irregular absorption. Although it is ideal that mask for exposure 127 for only Y, for example, does not absorb R and G light, they still exist only slightly when this irregular absorption exists. Since the mask for exposure 127 for each of M and C has irregular equally, a portion corresponding to this irregular absorption needs to be considered for establishing the transmission density.

Inverted transfer will be explained as follows.

In the present example, a sublimating thermal transfer printer (hereinafter referred to as a sublimating printer) which will be explained later is used for mask-making unit 20 for the reason that it offers excellent image quality despite its small size and its low price and it can be connected directly to a personal computer. While the sublimating printer has its advantage mentioned above, it has a disadvantage specific to its image forming system.

The disadvantage is represented by a phenomena that Y dyes transferred to an image-receiving layer first slip out of the image-receiving layer partially due to heat applied for transferring successively M dyes to the image-receiving layer located at the same position and thereby the density is lowered.

An amount of the inverted transfer tends to increase in inverse proportion to an amount of dyes transferred onto an image-receiving layer. So, when sublimating heat transfer is used for outputting a positive image directly, even density fluctuations which are greater in a high density area compared with those in low and medium density areas do not cause such a big problem because a luminosity factor of a human eye is low in a high density area. However, when outputting negative images as in the present example, if a density fall in a high density area takes place, it becomes a density fall in low and medium density areas as it is to be noticeable when the negative images are reversed to positive images through exposure printer 30.

Therefore, when making negative images in a sublimating printer, an amount of correction for inverted transfer is calculated because image quality is extremely deteriorated when a portion of density fall for dyes is not corrected.

Lastly, density values $Y_2$, $M_2$ and $C_1$ are converted to the levels of gradation values of the printer output, and are outputted to mask-making unit 20.

Figure 13:
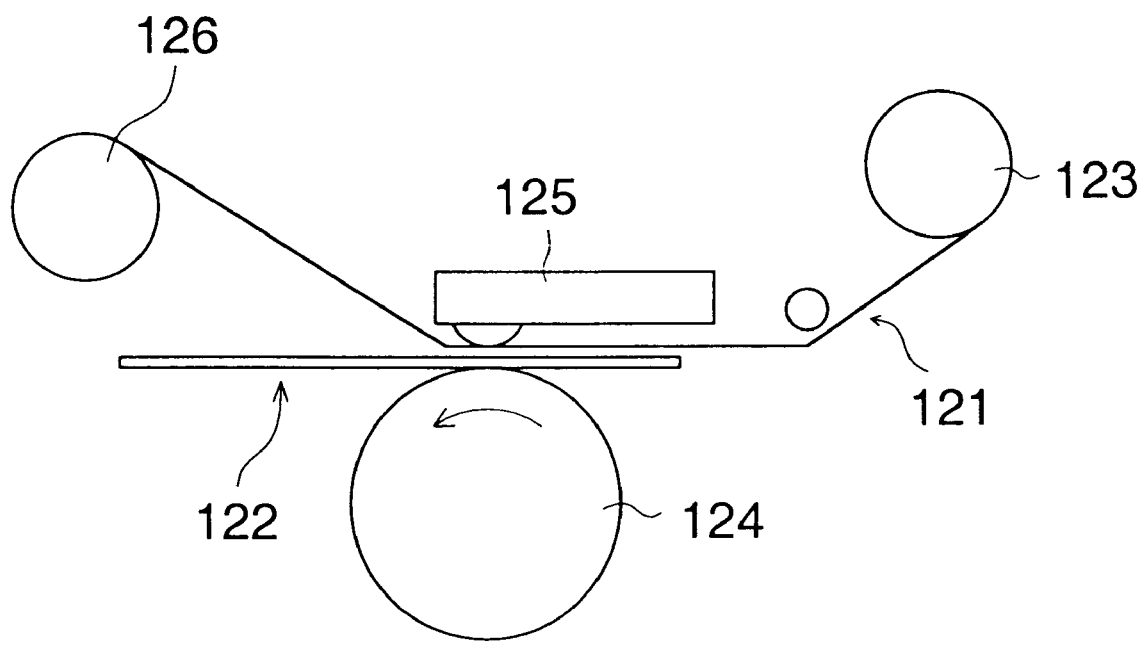
FIG. 13 is a schematic structural diagram of a sublimation type printer in the aforesaid example.

FIG. 13 is a schematic structural diagram of mask-making unit 20, namely of a sublimating printer, and the sublimating printer will be explained as follows, referring to FIG. 13.

Each area on ink sheet 121 having the same dimensions as in transparent image-receiving sheet 122 is coated repeatedly with dyes Y, M and C of a thermal diffusion type in succession, and the dyes are transferred and recorded in succession on the transparent image-receiving sheet 122 according to digital image data indicating gradation levels.

As a practical example of the sublimating printer, one employing a heating element having recording density of 3000 DPI is used as a thermal head. In this thermal transfer printer of a sublimating type, it is possible to cause each dot to indicate 256 levels of density for each of Y, M and C colors by changing energy to be applied on a thermal head. A relative movement distance for each travel in the sub-scanning direction on the sublimating printer is 85 [$\mu$m].

On the other hand, ink sheet 121 in the printer is a 6-$\mu$m-thick polyethyleneterephthalate support that is provided on its back side with a thermal-fusion-preventing layer and is provided thereon with Y, M and C layers, and transparent image-receiving sheet 122 is a 100-$\mu$m-thick transparent polyethyleneterephthalate support that is coated to be an image-receiving layer with a solution wherein 1 part of silicone oil and 60 parts of vinylchrolide resins are dissolved in 300 parts of methylethylketone so that weight of dried coating may be 15 g/cm$^2$.

Figure 14:
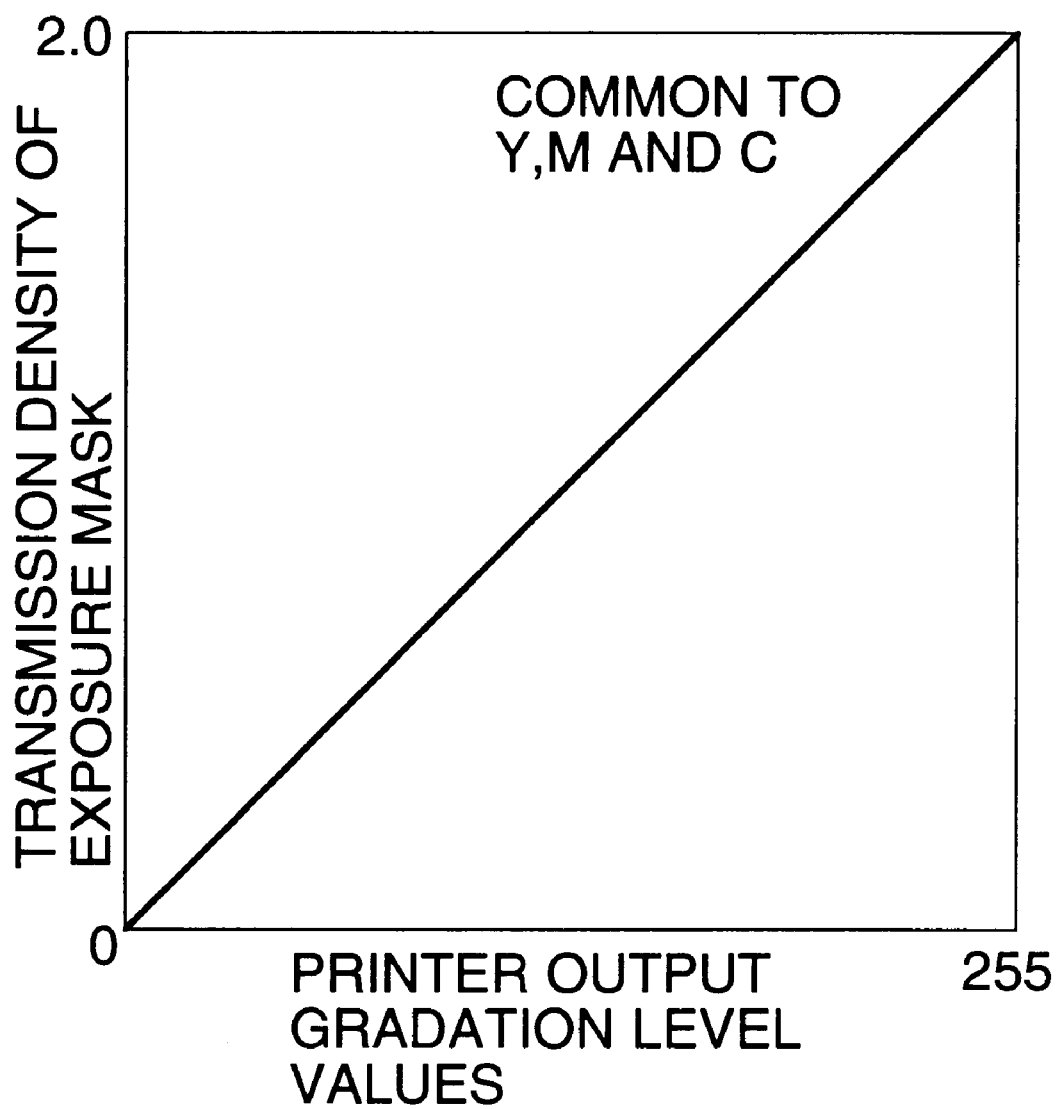
FIG. 14 is a diagram showing the relation between the transmission density of a mask for exposure and the gradation level value of an output of a printer.

As shown in FIG. 14, output densities are in proportion to 256 levels of input gradation as recording characteristics.

In the case of transfer recording, when transparent image-receiving sheet 122 is in A4 size, for example, each face of Y, M and C of ink sheet 121 is also in A4 size. After the ink sheet 121 is drawn out of ink sheet supply roll 123, face Y is first superimposed on the transparent image-receiving sheet 122 and is moved in succession under thermal head 125 by rotation in the arrowed direction of platen roller 124.

During this period, digital image data indicating gradation level of Y are inputted in the thermal head 125. Therefore, heat application causes dyes of a thermal diffusion type of Y in ink of ink sheet 121 to form in an image-receiving layer a dye image having gradation, in accordance with an amount of dye movement corresponding to an amount of heat pulses to the transparent image-receiving sheet 122.

Upon completion of transfer recording of Y, the ink sheet 121 is wound around take-up roll 126 up to the leading edge of face M thereof, and the transparent image-receiving sheet 122 is returned again so that its leading edge comes to the recording position of the thermal head 125, thus, face M of the ink sheet 121 is superimposed on the transparent image-receiving sheet 122 for the following transfer recording of M. In this manner, the same recording processes for M and C are repeated three times in total and thereby a color image is recorded on an image-receiving layer of the transparent image-receiving sheet 122 to be outputted as mask for exposure 127.

Incidentally, the ink sheet 122 is coated with three kinds of dyes of a thermal diffusion type of Y, M and C. The mask for exposure 127 is provided with a 100-$\mu$m-thick transparent support that supports an image-receiving layer.

Polyethyleneterephthalate (PET) was used for the transparent support.

Next, image outputting unit C will be explained as follows.

Figure 15:
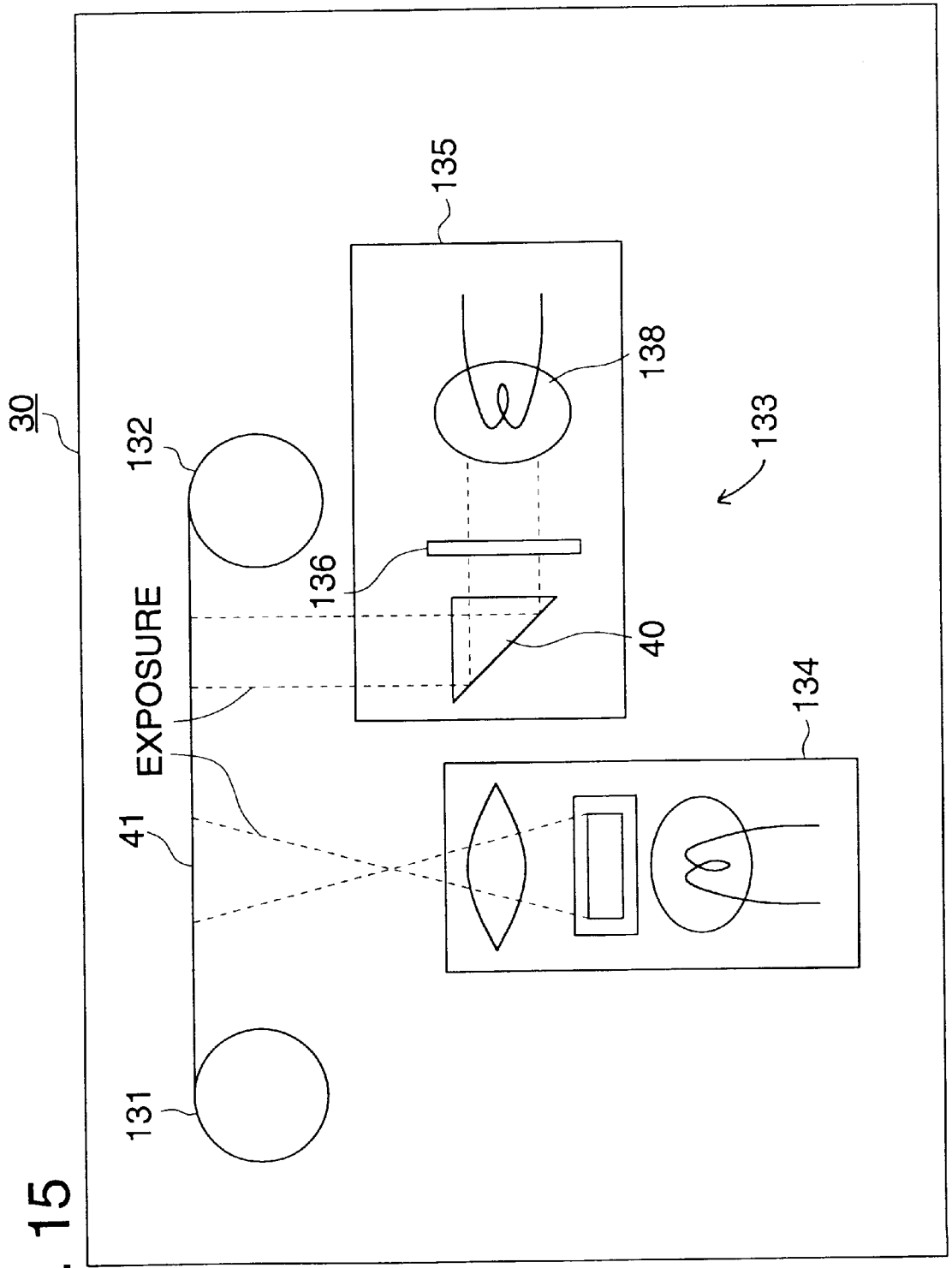
FIG. 15 is a schematic structural diagram of a exposure printer in the aforesaid example.
Figure 16:
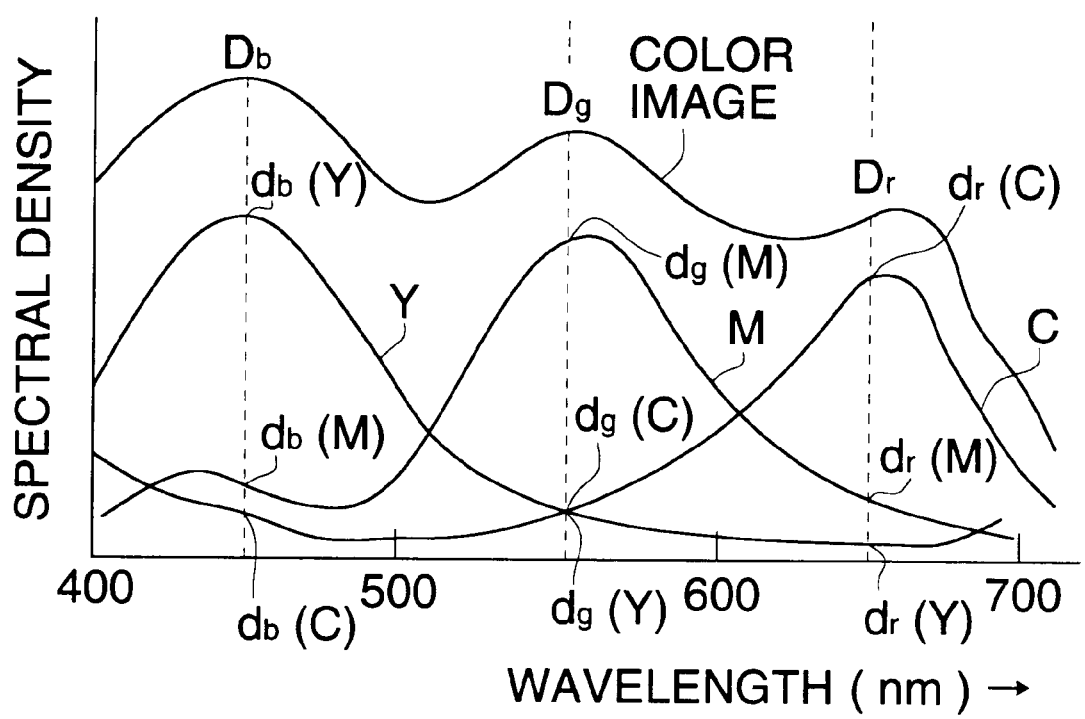
FIG. 16 is a diagram showing the spectral absorption characteristics of each dye and the spectral absorption characteristics of a color image formed by mixing these dyes.

In FIG. 15 showing a schematic structural diagram of exposure printer 30, roll-shaped photographic paper 41 is set on photographic paper supply roll 131 in advance, and then is moved for each exposure to be wound around photographic paper take-up roll 132. Exposure section 133 is divided into main exposure section 134 and sub-exposure section 135, and mask for exposure 127 is arranged on mask holder for exposure 136 in the sub-exposure section. There is given printing exposure when light from light source 138 passes through mask for exposure 127 and is projected on photographic paper 41 for a predetermined period of time through prism 40. This printing exposure can also be made on photographic paper 41 on a montage photography basis by the use of both main exposure to which a silver salt negative film is set and sub-exposure. The exposed photographic paper 41 is subjected to coloring, and is processed in processing unit 43 to become photographic print 44 that is obtained.

The conversion function memory medium in the example is a photominidisk, but it may also be a volatile memory medium. However, nonvolatile memory medium is preferable. As a nonvolatile memory medium, there may be given a recording medium such as a photominidisk, a battery-powered RAM chip, an IC card and a ROM chip. As a recording medium, a magnetic recording medium such as a floppy disk or a magnetic tape, an optical recording medium such as CD-ROM, and a photomagnetic recording medium such as MO are given, in addition to a photominidisk. Among nonvolatile memory media, rewritable memory media such as a recording medium, battery-powered RAM chip and IC card are preferable to non-rewritable memory medium such as a ROM chip, because setting can be easily changed. It is further acceptable that the conversion function is sent on an ON-LINE basis without relying on the conversion function memory medium 27.

In the example, when obtaining analytical density from spectral density, the conversion function read from the memory medium is used as it is. However, the conversion function read from the memory medium may be corrected to be used. In particular, when an image forming apparatus and materials for a print vary remarkably compared with accuracy of the analytical density aimed, it is preferable that an influence of the variation is corrected.

In the example, a description is made under the assumption that an apparatus for obtaining a conversion function and an image forming apparatus for forming a print are separate, and a conversion function is obtained by the apparatus for obtaining a conversion function, then is stored in a conversion function memory medium, the conversion function memory medium is then supplied to the image forming apparatus, and an image is formed by the image forming apparatus that is supplied with the conversion function memory medium. However, it is also accepted that an apparatus for obtaining a conversion function and an image forming apparatus are united integrally to be one, and a print is made by the use of a conversion function obtained by the image forming apparatus. Further, it is also accepted to store a conversion function obtained under the precise conditions in advance in a conversion function memory medium such as a ROM provided on the image forming apparatus mentioned above in a factory or a sales agent by using an image forming apparatus or an image forming apparatus that is the same as the aforesaid image forming apparatus in terms of machine model. Or, a user may also obtain the conversion function on an image forming apparatus.

The effects stated below can be obtained by the above-mentioned methods 1 to 15 of the invention.
Method 1

Due to this method that analytical density is obtained, through a densitometer, from each of a yellow image, a magenta image and a cyan image all formed on an image forming apparatus, it is possible to obtain analytical density which is based on characteristics of the image forming apparatus and is more accurate. Further, due to the method that spectral density is obtained by reading the yellow image, the magenta image and the cyan image all formed on the image forming apparatus by an image reading apparatus, it is possible to obtain the more accurate relation between the spectral density and the analytical density which is based on the characteristics of the image forming apparatus and the image reading apparatus. It is therefore possible to obtain more accurate conversion function for obtaining analytical density from spectral density. When this conversion function is used, a simple calculation makes it possible for a print made by the image forming apparatus to reproduce, with fidelity, the color images read by the image reading apparatus through reflected light.
Methods 2, 3 and 4

Due to these method, a print made by an image forming apparatus can reproduce, with higher fidelity, the color images read by an image reading apparatus through reflected light.
Method 3

With regard to analytical density of an image of each color and spectral density of a mixed-dye image formed by superimposing different images each having a single color, the analytical density and the spectral density are in a causal relation completely because an amount of dyes is the same for each color. Therefore, conversion function of analytical density from spectral density can be obtained correctly, which results in color reproduction with fidelity.
Methods 5, 6 and 7

Since conversion function is obtained by the use of images with plural density levels, a print made by an image forming apparatus can reproduce, with higher fidelity, the color images read by an image reading apparatus.
Methods 8 and 9

Since the conversion function for obtaining analytical density from spectral density is obtained for each density area of plural levels, a print made by an image forming apparatus can reproduce, with higher fidelity, the color images read by an image reading apparatus through reflected light especially in a low density area or in a high density area, even in the system wherein the relation between spectral density and analytical density varies depending on density.
Method 10

In this method, the aforesaid conversion function can be obtained accurately from the relation between the obtained spectral density and the analytical density, resulting in that a print made by an image forming apparatus can reproduce, with higher fidelity, the color images read by an image reading apparatus through reflected light.
Method 11

Since it is possible to eliminate an influence of secondary absorption in the course of measurement of analytical density, analytical density with higher accuracy can be obtained, resulting in that a print made by an image forming apparatus can reproduce, with higher fidelity, the color images read by an image reading apparatus through reflected light.
Method 12

In this method, the structure of an apparatus can be simpler. Especially, in the case of the method for determining conversion function for obtaining analytical density from spectral density described in
Method 10, a half-value width of spectral sensitivity distribution of each primary color of red, green and blue does not overlap each other in the aforementioned image reading apparatus. Therefore, influence of other primary colors can well be eliminated even in the case of measurement of spectral density, and thereby spectral density with higher accuracy can be obtained, resulting in that a print made by an image forming apparatus can reproduce, with higher fidelity, the color images read by an image reading apparatus through reflected light.
Method 13

Silver halide color photographic light-sensitive materials are used for obtaining conversion function and thereby color reproduction with higher fidelity can be realized, which is preferable. The reason for this is as follows. Compared with printed matters or the like wherein an image is formed with Y, M , C and K, a silver halide color photographic light-sensitive material has a characteristic that the change of density is well correlative to the change of color-mixing rate for all density areas and the causal relation between an amount of dyes and density tends to be clear, without an occasion that color K is added only to a specific density area (for example, a high density area) and thereby color continuity for color-mixing is lost. Accordingly, the obtained conversion function naturally has less errors (for example, a deviation produced when a multiple regression analysis is used), resulting in color reproduction with fidelity.

When an image on a silver halide color photographic light-sensitive material is read by an image reading apparatus, it is a matter of course that color reproduction with highest fidelity is achieved by a print on a silver halide color photographic light-sensitive material prepared by an image forming apparatus, for the reason that color reproduction areas are the same or glossiness is the same.
Method 14

In this method, a print made by an image forming apparatus can reproduce, with fidelity, a color images read by an image reading apparatus through reflected light.
Method 15

When there is available a conversion function memory medium that stores a conversion function for obtaining analytical density from spectral density which is prepared by both an image reading apparatus having the same spectral sensitivity characteristic as that of the aforesaid image reading apparatus and an image forming apparatus that makes a print having the same spectral coloring characteristic as that of the print made by the aforementioned image forming apparatus, a print made by the image forming apparatus can reproduce, with fidelity, the color images read by the image reading apparatus through reflected light, only through an offer of a conversion function memory medium or a conversion function, even when an operation for obtaining the conversion function f6r obtaining analytical density from spectral density is omitted.
Method 16

In this method, the analytical density of the yellow component in the blue wavelength region, the analytical density of the magenta component in the green wavelength region, and the analytical density of the cyan component in the blue wavelength region, are measured from the single dye images of the yellow image, the magenta image and the cyan image. Accordingly, each analytical density corresponds to the given amount of the dye used in the singly dye image. In the mixed-dye image, since the yellow dye, the magenta dye and the cyan dye are mixed, it may be difficult to measure the analytical density of each of the yellow, magenta and cyan components separately. However, by forming the mixed-dye image with the same amount of yellow, magenta and cyan dyes as those dyes used for the single dye images of the yellow, magenta and cyan images, the analytical density of yellow, magenta and cyan components obtained from the single dye images can be used as the analytical density of yellow, magenta and cyan components in the mixed-dye image.

When determining the analytical density in the mixed-dye image, if the mixed-dye image is formed by the same amount of dyes as that used for the single dye images, the same analytical densities obtained from the single dye images may be used for the mixed-dye image. However, if the mixed-dye image is not formed by the same amount of dyes as that used for the single dye images, the analytical densities in the mixed-dye image may be determined by the calculation such as interpolation on the basis of the analytical densities of the single dye images.

Method 17

Since the conversion table is obtained on the basis of the spectral densities obtained by the image reading apparatus, spectral densities of a color image obtained by the image reading apparatus can be precisely converted into analytical density by the conversion table.

Method 18

Since the analytical densities are measured by the densitometer, relatively wider range data can be obtained in comparison with the image reading apparatus such as an image scanner.

Method 19

Since the analytical densities are obtained from the spectral densities obtained by the image reading apparatus, it is not necessary to use the densitometer.

What is claimed is:

1. An image processing method, comprising steps of:
   (A) forming separately a yellow image with a given amount of yellow dye alone, a magenta image with a given amount of magenta dye alone and a cyan image with a given amount of cyan dye alone;
   (B) obtaining spectral densities of each of the yellow image, the magenta image and the cyan image in the red, green and blue wavelength regions;
   (C) obtaining an analytical density of a yellow component in the blue wavelength region from the yellow image, an analytical density of a magenta component in the green wavelength region from the magenta image, and an analytical density of a cyan component in the red wavelength region from the cyan image;
   (D) forming a mixed-dye image by using at least two of the given amount of yellow dye equal to the amount of yellow dye forming the yellow image, the given amount of magenta dye equal to the amount of magenta dye forming the magenta image, and the given amount of cyan dye equal to the amount of cyan dye forming the cyan image so that the mixed-dye image comprises at least two of a yellow component, a magenta component and a cyan component;
   (E) obtaining spectral densities of the mixed-dye image in the red, green and blue wavelength regions;
   (F) determining an analytical density of the yellow component in the blue wavelength region, an analytical density of the magenta component in the green wavelength region and an analytical density of the cyan component in the red wavelength in the mixed-dye image on the basis of the analytical densities of the yellow, magenta and cyan components in their complementary color wavelength regions obtained from the yellow, magenta and cyan images; and
   (G) arranging, for each of the yellow, magenta and cyan images and the mixed-dye image, the spectral densities in the red, green and blue wavelength regions obtained in the steps (B) and (E) so as to correspond to the analytical densities of the obtained in the steps (C) and (F), thereby obtaining a conversion function to obtain analytical densities of yellow, magenta and cyan components in their complementary color wavelength regions in a color image from spectral densities of the color image in the red, green and blue wavelength regions.

2. The method of claim 1, wherein the spectral densities in the red, green and blue wavelength regions are obtained by the use of an image reading apparatus.

3. The method of claim 2, wherein the spectral densities in the red, green and blue wavelength regions are obtained from light reflected from the yellow, magenta and cyan images and the mixed-dye image.

4. The method of claim 1, wherein the analytical density of the yellow component in the blue wavelength region, the analytical density of the magenta component in the green wavelength region, and the analytical density of the cyan component in the red wavelength region are obtained by the use of a densitometer.

5. The method of claim 2, wherein the analytical density of the yellow component in the blue wavelength region, the analytical density of the magenta component in the green wavelength region, and the analytical density of the cyan component in the red wavelength region are obtained from the spectral densities obtained by the use of the image reading apparatus.

6. The method of claim 5, wherein the spectral density of the yellow image in the blue wavelength region, the spectral density of the magenta image in the green wavelength region, and the spectral density of the cyan image in the red wavelength region which are obtained in the step (B) are used as the analytical density of the yellow component in the blue wavelength region, the analytical density of the magenta component in the green wavelength region, and the analytical density of the cyan component in the red wavelength region respectively in the step (C).

7. The method of claim 1, wherein when the mixed-dye image is formed by using the given amount of yellow dye, the given amount of magenta dye, and the given amount of cyan dye, the analytical density of the yellow component in the blue wavelength region, the analytical density of the magenta component in the green wavelength region, and the analytical density of the cyan component in the red wavelength region which are obtained in the step (C) are used as the analytical density of the yellow component in the blue wavelength region, the analytical density of the magenta component in the green wavelength region, and the analytical density of the cyan component in the red wavelength region in the mixed-dye image in the step (F).

8. The method of claim 1, wherein each of the yellow image, the magenta image, the cyan image and the mixed-dye image is separated into plural images differing in density level by changing the given amount of yellow dye, the given amount of magenta dye, and the given amount of cyan dye.

9. The method of claim 8, wherein the number of density levels is 3 to 80.

10. The method of claim 8, wherein the steps (B), (C), (E), and (F) are conducted for the yellow image, the magenta image, the cyan image and the mixed-dye image for each density level.

11. The method of claim 10, wherein the density levels are classified into a plurality of density regions, and the conversion function is determined for each of the plurality of density regions based on the analytical densities and the spectral densities of each of the density regions.

12. The method of claim 8, further comprising step of selecting one of the density regions in accordance with the density level of the color image so that the analytical densities of yellow, magenta and cyan components in their complementary color wavelength regions in the color image is obtained by the conversion function corresponding to the selected density region.

13. The method of claim 1, wherein the conversion function includes a matrix and the step of obtaining the conversion function obtains the matrix by a multiple regression analysis.

14. The method of claim 4, wherein the densitometer has a spectral sensitivity distribution for each of the red, green, and blue wavelength regions, and wherein a half-value width of each spectral sensitivity distribution does not overlap each other.

15. The method of claim 1, further comprising steps of:
   determining an amount of yellow dye, an amount of magenta dye, and an amount of cyan dye based on the analytical densities of yellow, magenta and cyan components in their complementary color wavelength regions in the color image; and
   forming an image with the amount of yellow dye, the amount of magenta dye, and the amount of cyan dye.

16. The method of claim 1, wherein the yellow image, the magenta image, the cyan image and the mixed-dye image are formed on a silver halide color photographic light-sensitive material, and an exposure amount of each of blue, green and red lights are controlled in accordance with the amount of each of the yellow dye, the magenta dye and the cyan dye.

* * * * *

UNITED STATES PATENT AND TRADEMARK OFFICE
CERTIFICATE OF CORRECTION

PATENT NO. : 6,002,498
DATED : December 14, 1999
INVENTOR(S) : Tsuyoshi HARAGUCHI et al.

It is certified that error appears in the above-identified patent and that said Letters Patent is hereby corrected as shown below:

On the Title Page, Item [57], in the Abstract, line 2, "are prepared" should read --and prepared--.

* Claim 1, Column 32, line 14, after "densities of the", insert --yellow, magenta and cyan components in their complementary color wavelength regions--.

Signed and Sealed this

Fourteenth Day of November, 2000

Attest:

Q. TODD DICKINSON

*Attesting Officer*   *Director of Patents and Trademarks*